(12) United States Patent
Strom

(10) Patent No.: US 8,635,138 B2
(45) Date of Patent: Jan. 21, 2014

(54) METHOD OF ANALYZING A SALE PROCESS FOR AN ENTITY

(71) Applicant: Steven R. Strom, New Caanan, CT (US)

(72) Inventor: Steven R. Strom, New Caanan, CT (US)

(73) Assignee: Steven R. Strom, New Canaan, CT (US)

( * ) Notice: Subject to any disclaimer, the term of this patent is extended or adjusted under 35 U.S.C. 154(b) by 0 days.

(21) Appl. No.: 13/663,226

(22) Filed: Oct. 29, 2012

(65) Prior Publication Data

US 2013/0054304 A1 Feb. 28, 2013

Related U.S. Application Data

(63) Continuation-in-part of application No. 12/504,507, filed on Jul. 16, 2009, now abandoned.

(51) Int. Cl.
*G06Q 40/00* (2012.01)
*G06Q 40/06* (2012.01)

(52) U.S. Cl.
CPC ............... *G06Q 40/00* (2013.01); *G06Q 40/06* (2013.01)
USPC ............................................. 705/35; 705/37

(58) Field of Classification Search
CPC .............................. G06Q 40/00; G06Q 40/06
USPC ..................................................... 705/35, 37
See application file for complete search history.

(56) References Cited

U.S. PATENT DOCUMENTS

| | | |
|---|---|---|
| 6,086,630 A | 7/2000 | Williams |
| 6,662,192 B1 | 12/2003 | Rebane |
| 7,006,978 B2 | 2/2006 | Lineberry |
| 7,415,437 B2 | 8/2008 | Marvin, III |
| 7,546,271 B1 | 6/2009 | Chmielewski |
| 2002/0198725 A1 | 12/2002 | Piepenbrink |
| 2004/0204983 A1 | 10/2004 | Shen |
| 2006/0271454 A1 | 11/2006 | Strom |
| 2009/0287549 A1 | 11/2009 | Strom |

*Primary Examiner* — Kirsten Apple
*Assistant Examiner* — Scott S Trotter
(74) *Attorney, Agent, or Firm* — Bracewell & Giuliani LLP

(57) ABSTRACT

A computer-implemented method determines determine an adequacy of a process to sell an entity responsive to competition, fairness, thoroughness, and good faith. A computer evaluates a sale of an entity by rating solicitation efforts associated with potential buyers of the entity (audience), by rating information about the entity prepared for potential buyers, by rating time frames surrounding the sale (timing), by rating circumstances associated with a transfer of the entity, and by rating a negotiation and execution efforts associated with the sale of the entity. Each criteria investigated is provided a weighting factor, where the weighting factor for the audience and transfer is around 0.25, the factor for the information and negotiation and execution is around 0.20, and the weighting factor for the timing is around 0.10.

18 Claims, 13 Drawing Sheets

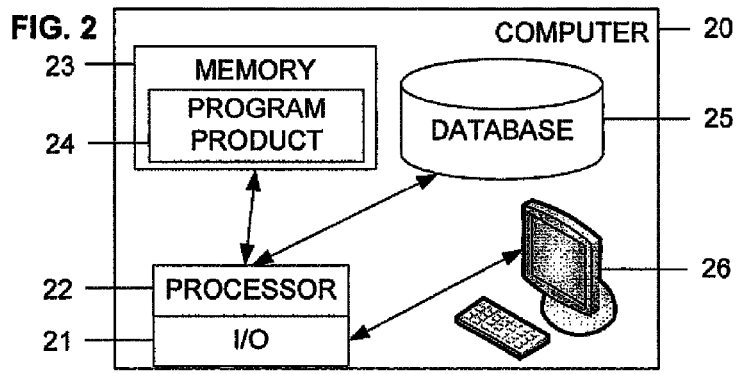
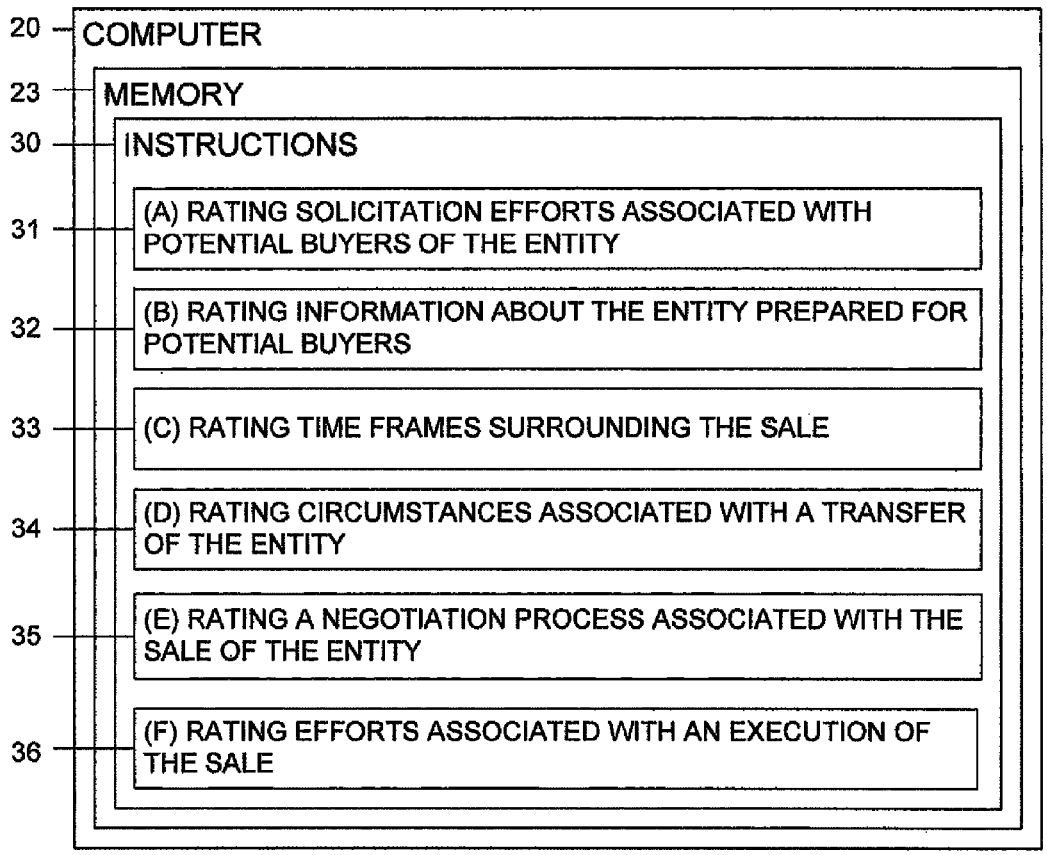

METHOD OF ANALYZING A SALE PROCESS FOR AN ENTITY

CROSS REFERENCE TO RELATED APPLICATIONS

This application claims priority to and the benefit of co-pending U.S. application Ser. No. 12/504,507, filed Jul. 16, 2009, the full disclosure of which is hereby incorporated by reference herein.

BACKGROUND OF THE INVENTION

1. Field of the Invention

The present disclosure relates generally to the field of evaluating the process for selling an entity, e.g., a company. More specifically, the present disclosure includes a method, machine, and computer program product for evaluating a sale process involving the sale of an entity.

2. Description of Related Art

There are several methods by which a company sells itself, a division of itself, or some of its assets (i.e., real, tangible, intangible, or intellectual property). For example, a public company can announce it has retained an investment bank and is "considering strategic alternatives." The investment banker then solicits interest from potential buyers and selects the highest and best proposal. When a sale is consummated, the board of directors may obtain a "fairness opinion" from a nationally-recognized investment bank in order to determine the fairness, from a financial perspective, of the transaction. In another example, a company in Chapter 11 can seek court approval to sell assets free and clear of liens pursuant to Section 363 of the Bankruptcy Code. In this example, the sale may involve selection of a stalking horse bidder and then overbidding in an auction format in court. A third example of a different process involves owners of a private company selling the business to a loyal management team or heirs without a competitive process, using an investment banker to develop an opinion on value or asking a private equity firm their perspective on value and letting the buyer execute at this price. A fourth example is a parent company selling a small subsidiary and negotiating with only one or two parties with respect to purchase price.

In each of these circumstances, the entity being sold is, in one-way or another, exposed to the market to determine value. The process of market exposure, however, differs in each case. The process of exposure and the resulting value assigned to the target business by market forces may be controversial. For example, creditors in a bankruptcy plan or asset sale may allege that the process was created to favor an inside buyer. In other circumstances, a board of directors may find themselves with "Revlon duties" requiring that the target company put itself up for sale and a hostile acquirer may contend they were discriminated against in the sale process. Unfortunately, a faulty sale process can lead buyers to an inaccurate level for "market value," often implying a lower value for the business than might otherwise be obtained in a competitive process that is conducted fairly, thoroughly, and in good faith. Accordingly, parties alleging that the sale process provides an accurate measure of market value (or those attacking the validity and resulting value of such process, including shareholders and creditors) can benefit from a methods, e.g., computer-implemented methods, machines, and program products to evaluate a sale process.

BRIEF SUMMARY OF THE INVENTION

Disclosed herein is a computer implemented method for evaluating a sales process of an entity, e.g., an acquisition, a merger, purchase, consolidation, amalgamation, or reorganization. Embodiments include a computer evaluating a sale of an entity. Examples of computer evaluation include rating solicitation efforts associated with potential buyers of the entity, rating information about the entity prepared for potential buyers, rating time frames surrounding the sale, rating circumstances associated with a transfer of the entity, rating a negotiation process associated with the sale of the entity, rating efforts associated with an execution of the sale, and combinations thereof. The entity can be a company or other business entity, including a corporation or a division of a corporation or a product line; real property; intellectual property; any otherwise transferable asset or group of assets; or a combination thereof as understood by those skilled in the art.

Example embodiments can include, for example, a computer-implemented method of evaluating a sale of an entity, where the entity can be a business entity, and that includes receiving data in a processor indicative of an audience targeted by a seller of the business entity. calculating in the processor an audience score based on the data received, and applying in the processor a weighting factor to the audience score to define a weighted audience score. These steps are repeated for information about the sale of the entity, timing of the sale of the entity, transfer of the entity, and negotiation and execution of the sale of the entity. Thus also calculated are scores and weighting factors for the scores of information, timing, transfer, and negotiation and transfer of the sale of the entity. The weighted scores are summed in the processor to define a total score, and the total score is compared to a designated threshold score in the processor, where the threshold score is accessible by the processor from a database connected to the processor. Based on the comparison, it is determined in the processor that the process for the sale of the entity was adequately exposed to a market of prospective purchasers if the total score exceeds the threshold score. In an example, applying in the processor a weighting factor to the audience score limits the weighted audience score to a maximum of about 25% of a total maximum score, optionally the information score is limited the weighted information score to a maximum of about 20% of a total maximum score, optionally the weighted timing score is limited to a maximum of about 10% of a total maximum score, optionally the weighted transaction score is limited to a maximum of about 25% of a total maximum score, and optionally the weighted negotiation and execution score is limited to a maximum of about 20% of a total maximum score. In one example, calculating an audience score includes awarding 4 points if the seller provides a buyer's log that details dates of communication information between the seller and a prospective purchaser, awarding 4 points if the seller provides a buyer's log that details communication information between the seller and a prospective purchaser and lists a name and title of a contact person at a prospective purchaser, awarding 4 points if the seller provides a buyer's log that details communication information between the seller and a prospective purchaser and lists a name of a contact person associated with seller, awarding 4 points if the seller provides a buyer's log that details communication information between the seller and a prospective purchaser and lists status of one of the following, any non-disclosure agreements between seller and a prospective purchaser, access by a prospective purchaser to a data room, a bid for the purchase of the business entity, and summing the points awarded to define a first intermediate score. In this example, calculating an audience score further includes awarding a point for each prospective purchaser contacted by seller, up to 40 points.

Calculating an audience score can further involve awarding −1 point every time an inquiry to or from a prospective purchaser was unanswered, awarding −1 point every time the prospective purchaser contacted was unauthorized to purchase the business entity, awarding −1 point every time a prospective purchaser failed to execute a confidentiality agreement, summing the points awarded, and multiplying the sum by 4 to define a third intermediate adjustment score. Further in this example, −10 points are awarded if more than 3 prospective purchasers declined to submit bids because of an obstacle curable by the seller; which define a fourth intermediate adjustment score. The method of this example can further include awarding −1 points every time a prospective purchaser is engaged in a business different from the business entity being sold, awarding −1 points every time a prospective purchaser had not previously expressed an interest in acquiring or investing in the business entity being sold, awarding −1 points every time the prospective purchaser is in a stream of commerce different from the business entity being sold, awarding −1 points every time a prospective purchaser has no experience in the business entity being sold, summing the points awarded to define a fifth intermediate adjustment score. Further in this example, the first, second, third, fourth, and fifth intermediate scores are summed to define an audience score, and a weighted audience score is calculated to be the lesser of the audience score or 25.

Calculating an information score can include awarding 0.5 points for every instance where the seller provided a projection of the business entity that substantially accurately reflected the financial status of the business entity, awarding 0.5 points for every instance where the seller provided details about the condition of the business entity and substantially accurate financial statements, awarding 0.5 points for every instance where the seller provided details about contracts in which the business entity was a party, awarding −1 points for every instance where the seller failed to provide details about contracts in which the business entity was a party, awarding 0.5 points for every instance where the seller provided updates to any information provided in a data room, awarding 0.5 points for every instance where the seller provided an opportunity to discuss information about the business entity, summing the points awarded to define a first intermediate information score. This example can further include awarding 2 points for each prospective purchaser that executed a confidentiality agreement to receive information regarding the business entity, multiplying this sum with the first intermediate information score to define an information score, and calculating a weighted information score to be the lesser of the information score or 20.

Calculating a timing score can include calculating the number of days between a date of an initial communication between the seller and a prospective purchaser, dividing the number of days by 15 to define a first intermediate timing score, awarding 2 points for every instance where a competitor of the business entity was involved in public financing or a merger and acquisition that occurred from a period between an initial contact and an initial bid to define a second intermediate timing score, awarding a score of −25 points if the period from when the first contact from the seller to a prospective to an initial bid due date was less than 20 business days a third intermediate timing score, awarding a score of −15 points if a material adverse change clause was invoked by other prospective purchasers of another business entity within 5 days of the initial bid due date a fourth intermediate timing score, summing the lesser of the first intermediate score and 8, the lesser of the second intermediate score and 6, and the third and fourth intermediate timing scores to define a timing score, and a weighted time score is calculated to be the lesser of 10 or the timing score.

Calculating a transfer score can include awarding a score of −10 points in instances where the seller cannot articulate how to transfer ownership of the business entity to a prospective purchaser and the value of the business entity is greater than debt assigned to the business entity, awarding a score of 15 points if the seller proposes a Section 363 bankruptcy sale, awarding a score of −15 points if a proposed closing date is more than 12 months in the future, awarding a score of 10 points if the sale of the business entity is appraised by an independent entity, awarding a score of −10 points if evidence exists that the sale of the business entity to a purchaser will provoke litigation, summing the points awarded to define a transfer score, and calculating a weighted transfer score to be the lesser of the transfer score or 25.

Calculating a negotiation and execution score can include awarding a score of 5 points for each instance where a bid received by the seller is greater than an initial proposed selling price of the business entity, awarding a score of −5 points for each instance where an information request to the seller was not responded to within 48 hours, awarding a score of 3 points for each round of bids prior to selecting a winning bid, awarding a score of 10 points if the seller receives a fairness opinion, awarding a score of −20 points if the seller devoted an amount of time on a bid from a prospective purchaser with a preexisting relationship to the business entity that was greater than an amount of time spent on a bid from a prospective purchaser with no preexisting relationship to the business entity, awarding a score of 2 points for each instance where an initial bid was received, awarding a score of −1 points for each instance where the seller contacted a prospective purchaser who had not previously been involved in the sale of a business having a size similar to the business entity, awarding a score of −1 points for each instance where more than two prospective purchasers indicate inadequate information was provided by seller to enter into an investment decision, awarding a score of −1 points for each instance where the seller failed to provide information to complete schedules to a purchase agreement prior to closing, summing the points awarded to define a negotiation and execution score, and calculating a weighted negotiation and execution score to be the lesser of the negotiation score and 20.

In an example, the threshold value is around 50% of a maximum total score. Optionally, the processor that the process for the sale of the entity was not adequately exposed to a market of prospective purchasers if the total score is equal to or less than the threshold score.

In another example embodiment of a computer-implemented method, the steps of receiving information can further include prompting a user for a point score in response to one of more questions to evaluate an aspect of the sale of the entity.

BRIEF DESCRIPTION OF THE DRAWINGS

FIG. 2 is a schematic block diagram of a machine to evaluate a sale of an entity according to an embodiment of the present disclosure.

FIG. 3 is a schematic block diagram of a computer having computer program product stored on a tangible computer memory media according to an embodiment of the present disclosure.

DETAILED DESCRIPTION OF THE INVENTION

Figure 1:
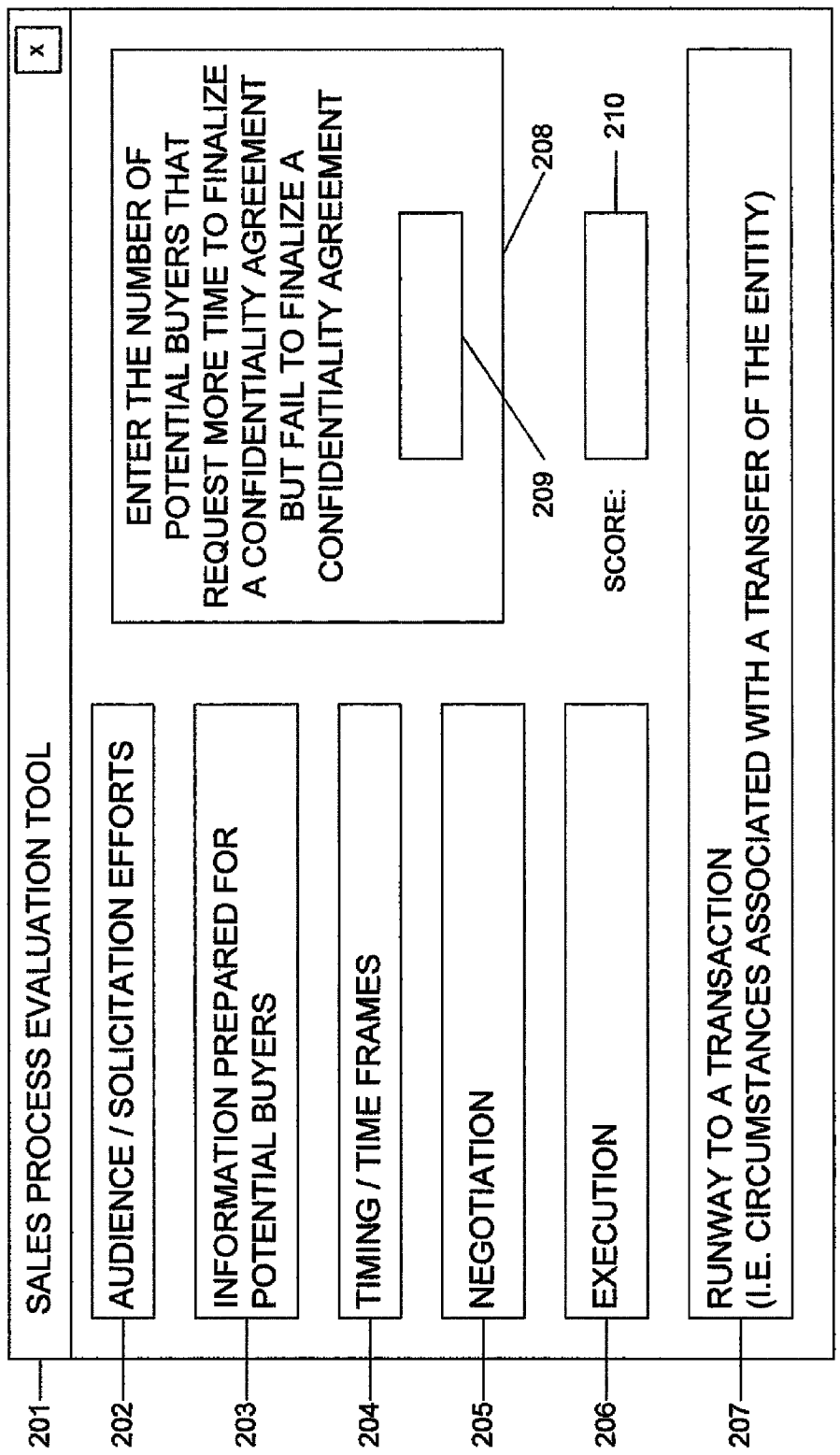
FIG. 1 is a front plan view of a display screen of a computer displaying a sales process evaluation tool program according to an embodiment of the present disclosure.

The evaluation of a sale process is often necessary where economic beneficiaries of a sale or other party impacted by the value of a sale seek to contest or affirm the results of the value derived from the sale process. The evaluation of a sale can include determining if a process of selling a business entity, e.g., a corporation, a division, a product line, or other assets, was fairly executed. The act of determining if a process of selling a business entity is fair can be accomplished by a bankruptcy court judge, creditors' committee, board of directors, shareholders, creditors, or other party, or by professionals on behalf of a party. A fair and adequate sale process occurs when the entity being sold is or was adequately exposed to the market. In one example, adequately exposed to the market involves including enough potential buyers in the sales process such that adding potential buyers, i.e., potential purchasers, would not be expected to substantially increase the amount ultimately paid for the entity.

A potential buyer can include, for example, a person or entity who has been involved in other sales processes of the same or similar entities, or are part of a group or class what was been involved in other sale processes of the same or similar entities. Logical potential buyers also include competitors, as understood by those skilled in the art. It is well within the scope of those skilled in the art to identify a potential buyer and formulate an expectation of a substantial increase in purchase price based on the amount and type of potential buyers to whom the opportunity was exposed. A prospective buyer, i.e., a potential buyer, includes a buyer who was involved in the sale process, whether or not the buyer submits a proposal or bid. According to embodiments of the present disclosure, an adequate sale process is a process that that yields a value that is a meaningful indicator of market value. For the purposes of disclosure herein, a sale process assessed to be adequate would necessarily also be fair.

A sale process is typically conducted in order to determine the value, i.e., a market value, of an entity by exposing the entity to a market of potential buyers. In one example of a sale process an investment banker solicits offers from interested parties or likely interested parties. If the process yields an accurate market value for the target company, the process is said to be adequate. In one example "an accurate market value" is a price paid for the entity sold, or agreed to be paid, that is at close to or greater than the price a willing buyer would exchange to a willing seller in an arm's length transaction. In one example, "close to" is at least about 95% of the price the willing buyer would exchange. According to embodiments of the present disclosure, there are at least four criteria to determine whether a sale process is adequate: fairness, thoroughness, competition, and good faith. Fairness includes all participants competing on the same basis. That is, in a fair process, insider potential buyers do not have better access to information than outsider potential buyers; in a fair process, there is no thumb on the scale. Thoroughness includes sufficient exposure that additional exposure to the market would not likely lead to a significantly different transaction value or structure. In a thorough process, potential buyers' questions are answered quickly and completely. Competition includes multiple potential buyers bidding against each other. Good faith includes the sellers trying to maximize the value for the sale and not favoring one subset of potential purchasers over another.

According to embodiments of the present disclosure, evaluating a sale process for adequacy can involve assessing the process in, general areas to satisfy these criteria. Embodiments of the present disclosure, for example, can assess the process with respect to: audience, information, timing, transfer, negotiation, and execution. In an example embodiment, assessing the facts and circumstances of the sale process involves making inquiries, e.g., post-event inquiries, into these categories, enabling the user to gain insight into the criteria for adequacy and make a determination as to the overall adequacy of the sale process. In example embodiments, a value or score may be assigned and recorded where the value is dependent on the result of a particular query. In an example, queries relating to the audience are made and a score is assigned based on a particular response. Similarly, queries are made with respect to each of information, timing, transfer, negotiation, and execution, and scores are assigned for a response to each query. In a further example, scores for the queries in each category are totaled to define a total score for each category. Summing the total scores for each category can give a total score, than when compared to a designated value can provide a quantitative method for determining if the sales process was adequately exposed to the market, and therefore discern if the sales process was fair. Further optionally, the total scores for each category can be weighted. Examples of a weighted category involve limiting the total score of a category, and wherein the limit value can be a percentage of the total score.

As illustrated in FIG. 1, an embodiment of the present disclosure can include, for example, a display screen of a computer (see also, item 26 in FIG. 2) displaying a sales process evaluation tool 201 program. The program can be organized into categories, including, for example, audience 202, information 203, timing 204, negotiation 205, execution 206, and transfer 207. For a given query 208, the program 201 can prompt the user for an input 209. In addition, the program 201 can calculate, or otherwise determine, a score 210 for the query response to the input from the user. Alternately, a score can be calculated, or otherwise determined, automatically (without further input from the user) responsive to inputs from a buyers log or data room.

As illustrated schematically in FIGS. 2 and 3, example embodiments include a machine 20 to evaluate a sale of an entity. The machine 20 can include, for example, a processor 22 positioned to evaluate a sale of an entity; an input/output interface 21 for receiving and displaying data between the processor 22 and a user; an optional display 26; and a database 25 to store various calculated scores; and a memory 23 having stored therein computer program product 24. The program product 24 can be, for example, stored on a tangible computer memory media 23 and operable on the processor 22. The computer program product 24 can include, for example, a set of instructions 30 that, when executed by the processor 22, cause the processor to evaluate an acquisition of an entity by performing various operations. The operations can include: (a) rating solicitation efforts associated with potential buyers of the entity 31; (b) rating information about the entity prepared for potential buyers 32; (c) rating time frames surrounding the sale 33; (d) rating circumstances associated with a transfer of the entity 34; (e) rating a negotiation process associated with the sale of the entity 35; and (f) rating efforts associated with an execution of the sale 36.

Figure 4:
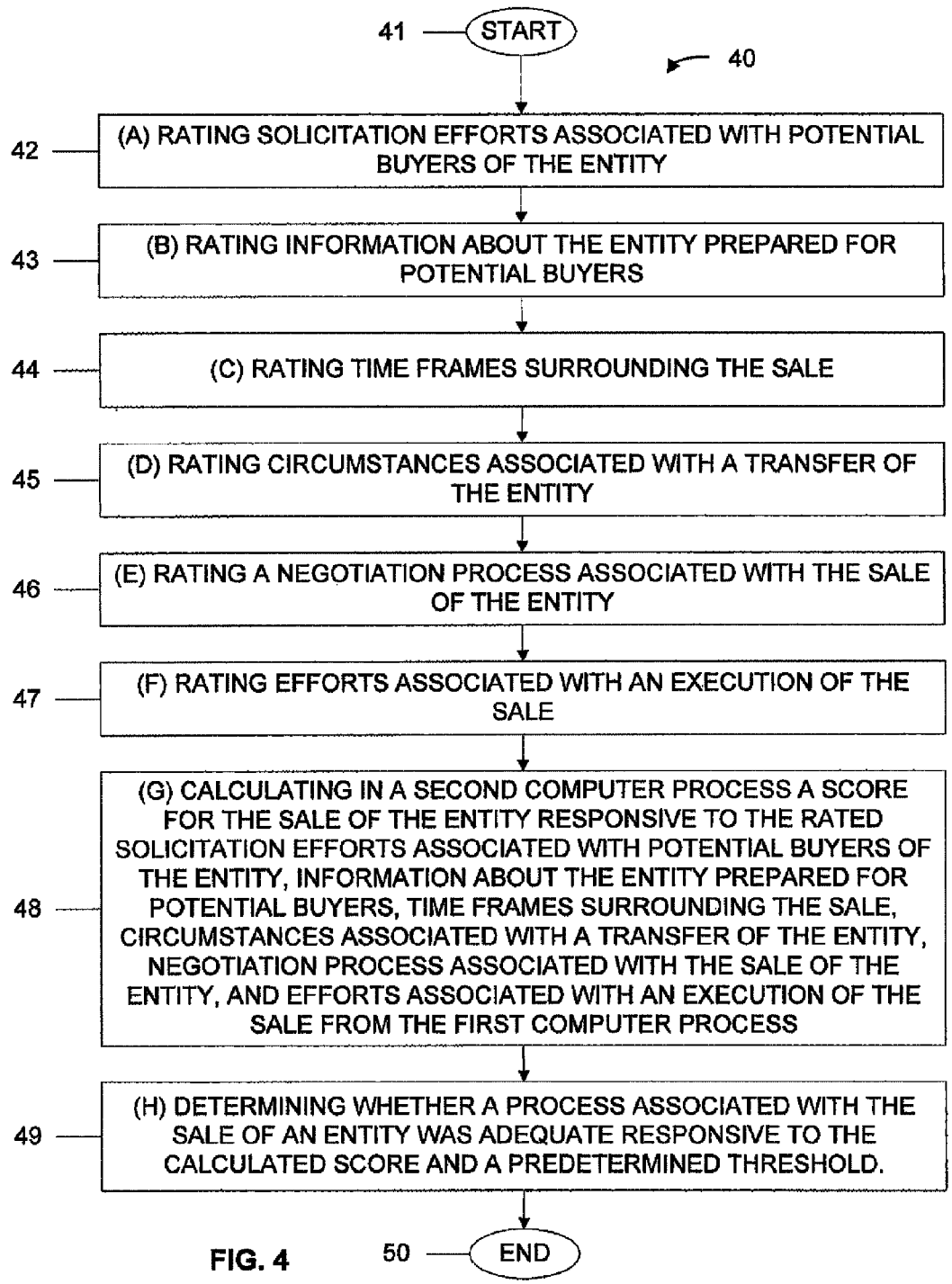
FIG. 4 is a schematic flow diagram of a computer-implemented method of evaluating a sale of an entity according to an embodiment of the present disclosure.

As illustrated schematically in FIG. 4, is an example embodiment of a computer-implemented method 40 of evaluating a sale of an entity. The computer-implemented method 40 can include: (a) rating solicitation efforts associated with potential buyers of the entity 42; (b) rating information about the entity prepared for potential buyers 43; (c) rating time frames surrounding the sale 44; (d) rating circumstances associated with a transfer of the entity 45; (e) rating a negotiation process associated with the sale of the entity 46; (f) rating efforts associated with an execution of the sale 47, and combinations thereof. According to an example embodiment, steps (a) through (f) can be performed in a first computer process. The computer-implemented method can also include: (g) calculating a score for the sale of the entity responsive to the above ratings 48, and (h) determining whether a process associated with the sale of an entity was adequate responsive to the calculated score and a predetermined threshold, e.g., a score or total 49. In an alternative embodiment step (g) is conducted in a second computer process. The computer-implemented method can also include displaying to the user the calculated score for the sale of the entity. In another example embodiment of a computer-implemented method, steps (a) through (f) can further include prompting a user for a point score in response to one of more questions to evaluate an aspect of the sale of the entity.

A. Audience

The audience category includes rating solicitation efforts associated with potential buyers of the entity. The audience includes all who are approached as a potential buyer of the target company, e.g., through a list of potential purchasers of the company being sold; unsolicited potential buyers who express an interest during the process; marketplace professionals, including attorneys and investment banks; and the media. Answers to the following questions can help determine if the appropriate audience was addressed.

1. What was the basis for selecting the original list of potential buyers?

This inquiry can reveal if a good faith and thorough effort was made to identify and solicit purchasers, i.e., buyers, who could reasonably be expected to consider consummating a purchase of the target and would foster competition. Good faith could be indicated by inclusion of bidders who may terminate employees or shut down facilities or are otherwise controversial. The number of potential purchasers considered may measure thoroughness. The type of potential purchasers solicited may also measure thoroughness or adequacy. Typically, the sale of a company involves the direct solicitation of potential purchasers. A list of potential purchasers is usually developed by the seller's investment banker and is formulated by researching companies that have similar operations to the target, a strategic fit with the target, or otherwise has considered or will consider acquisitions with the characteristics of the target entity. Investment bankers also develop the list of potential purchasers from their experience and databases on merger and acquisition activity and participation in an industry. Choosing potential purchasers who have no involvement in the particular industry of the target would probably not be productive. For example, approaching a group of consumer product companies about the acquisition of a steel company might indicate problems with the audience being pursued as buyers and lead to the conclusion that the results of such a process are flawed or not adequate.

Figure 5A:
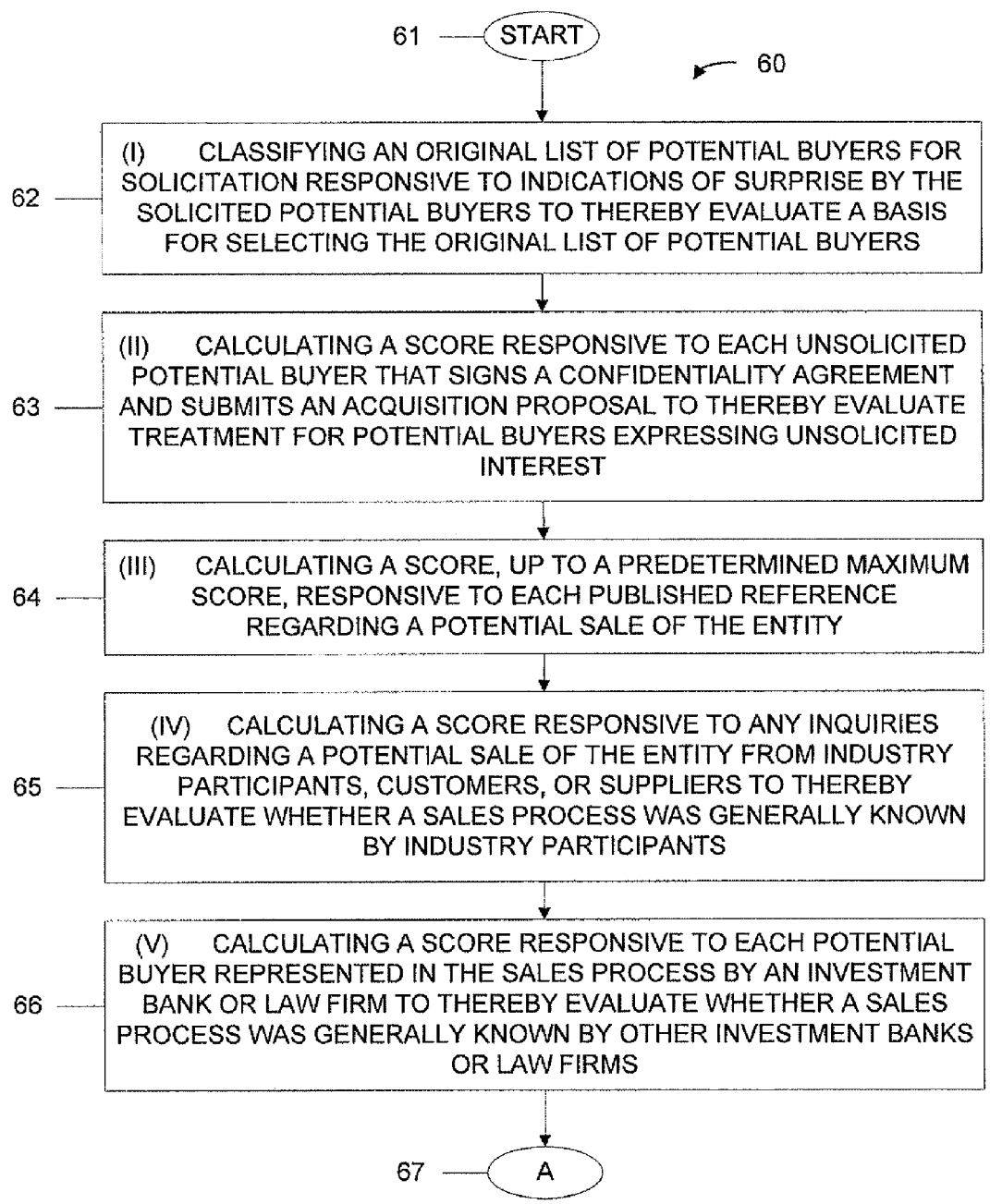
FIGS. 5A and 5B are schematic flow diagrams of a computer-implemented method of evaluating a sale of an entity according to an embodiment of the present disclosure.

Embodiments of the present disclosure can include, for example, classifying an original list of potential buyers for solicitation responsive to indications of surprise by the solicited potential buyers to thereby evaluate a basis for selecting the original list of potential buyers. See, e.g., item 62 in FIG. 5A. Surprise by a solicited potential buyer can indicate a flawed process.

2. What was the treatment for parties expressing unsolicited interest?

Occasionally, parties not identified upfront as potential purchasers of the target may be otherwise made aware of a transaction opportunity and express interest in participating. Sometimes these parties are legitimate purchasers, and sometimes they are not. But the seller of the entity needs to address these "reverse inquiries" in order to ascertain whether the party expressing an interest could possibly complete a transaction. Here the question is asked if legitimate unsolicited inquiries were treated in an accommodating fashion or not. This query can ascertain if any bias on the part of the seller for or against certain purchasers is present, i.e., fairness, and whether competition was encouraged.

Embodiments of the present disclosure can include, for example, calculating a score responsive to each unsolicited potential buyer that signs a confidentiality agreement and submits an acquisition proposal to thereby evaluate treatment for potential buyers expressing unsolicited interest. See, e.g., item 63 in FIG. 5A. An unsolicited party being welcomed indicates fairness in the process. The signing of a confidentiality agreement or submitting a proposal indicates that the unsolicited party is legitimate or truly interested.

3. Did the target make any announcement regarding the potential sale of the company?

This query examines the publicity of the sale. Publicity may result in greater "reverse inquiry." While the absence of an announcement is not determinative of a flawed sale process; it can be an indicator that there was diminished competition or the process was otherwise inadequate when viewed in combination with other evidence. Sometimes the target company will meet with several investment banks or the intermediaries to understand its strategic alternatives or might issue a press release that it is "exploring strategic options." The venue for such publications range from major newspapers of record to industry and trade journals. However, these publications may only allude to the prospect of a sale. Research analyst reports may also be considered in determining the market's understanding of whether a company is for sale.

Embodiments of the present disclosure can include, for example, calculating a score, up to a predetermined maximum score, responsive to each published reference regarding a potential sale of the entity. See, e.g., item 64 in FIG. 5A.

4. Was the sale process known generally by industry participants?

The more parties that know and can compete, even as "reverse inquiry" buyers, the more likely there will be competition to buy the target company, and the greater pressure there will be for the target to conduct a sale process that is fair, thorough, and in good faith.

Embodiments of the present disclosure can include, for example, calculating a score responsive to any inquiries regarding a potential sale of the entity from industry participants, customers, or suppliers to thereby evaluate whether a sales process was generally known by industry participants. See, e.g., item 65 in FIG. 5A.

5. Was the sale generally known by other investment bankers?

For the same reasons the thoroughness of a transaction can be assessed based on the knowledge of industry participants who aware of the sale, the volume of investment bankers who know about the transaction can indicate to a skilled analyst whether or not a thorough process has been conducted. Frequently, investment bankers not retained by the target company may also solicit interested buyers in hopes of providing advisory or financing services to potential bidders. This can serve to foster competition by adding thoroughness.

Embodiments of the present disclosure can include, for example, calculating a score responsive to each potential buyer represented in the sales process by an investment bank or law firm to thereby evaluate whether a sales process was generally known by other investment banks or law firms. See, e.g., item 66 in FIG. 5A.

6. Were any logical potential buyers not approached, and why?

Logical buyers include competitors of the target company as well as a buyer with potential synergies or cost savings thru consolidation with the target. Sometimes management of a business does not want to be purchased by a competitor simply because current management may be replaced or demoted after such a sale. In other circumstances, confidentiality and potential business interruption concerns may be voices as reasons to avoid negotiations with competitors. Moreover, the absence of logical potential purchasers may indicate a purposeful avoidance of knowledgeable purchasers who would be more likely to pay a fair purchase price.

Figure 5B:
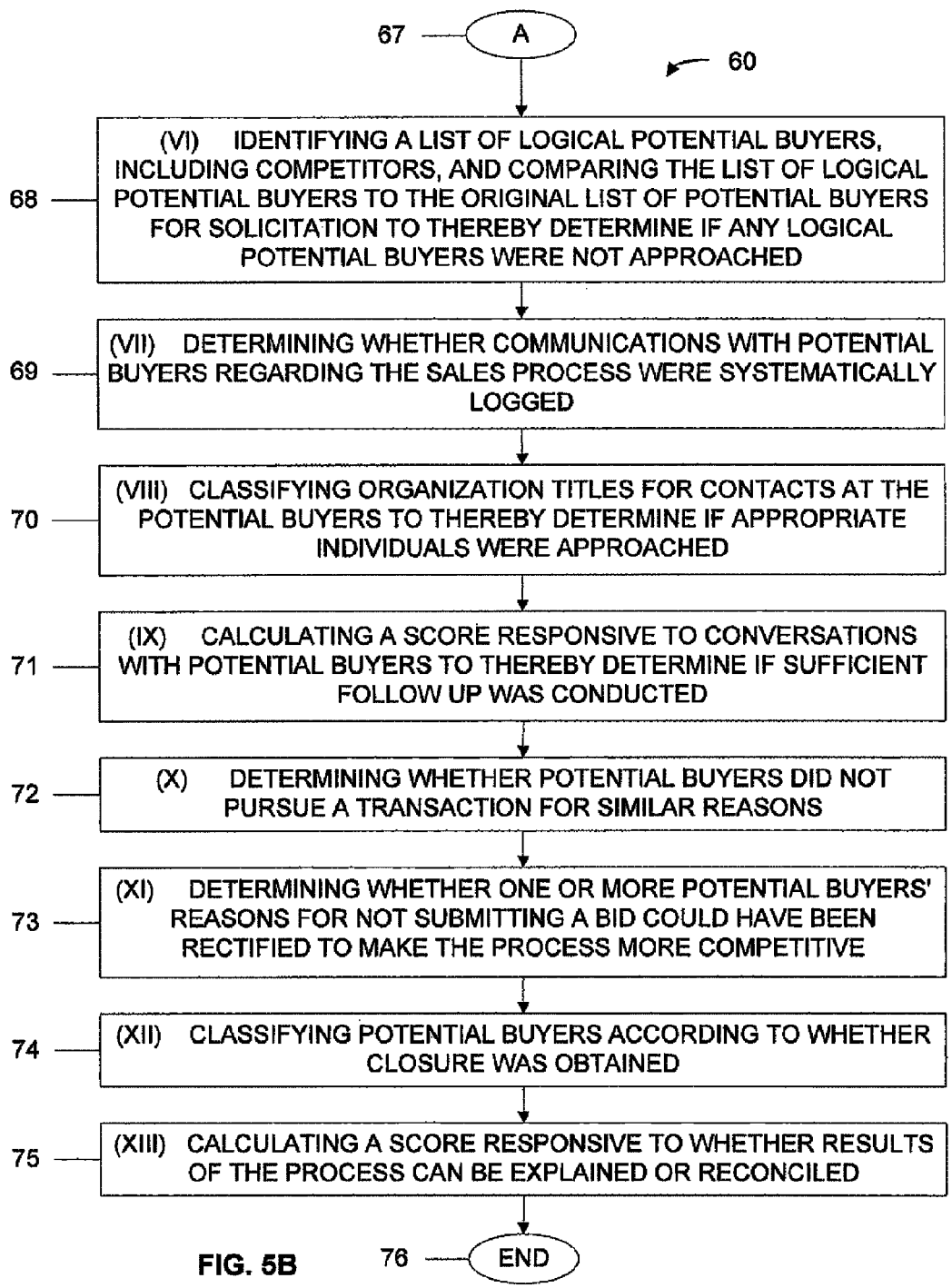

Embodiments of the present disclosure can include, for example, identifying a list of logical potential buyers, including competitors, and comparing the list of logical potential buyers to the original list of potential buyers for solicitation to thereby determine if any logical potential buyers were not approached. See, e.g., item 68 in FIG. 5B.

7. Is there a Buyers Log, e.g., an electronic buyers log, or comparable description of the timing and detail of the sale process with potential buyers?

Having a detailed log, e.g., an electronic log, listing potential buyers can enable third parties to readily analyze the timing, the buyers who were approached, and other relevant issues in a sale process. Reviewing the log of buyers may provide insight into the competitiveness and thoroughness of the process. In a process that is likely to be contested, most target companies can insist on a buyers log to document the timing of the process and parties approached. Moreover, a thorough Buyers Log can provide evidence to satisfy queries into the adequacy of the sales process and to automate such queries. For example, an electronic buyers log may interact with an electronic data room, advisors' e-mail systems and phone systems, and other data systems to provide fully integrated information.

Embodiments of the present disclosure can include, for example, determining whether communications with potential buyers regarding the sales process were systematically logged. See, e.g., item 69 in FIG. 5B.

8. Were the right individuals at the firms approached?

Although a particular company had been contacted regarding purchase of the target, the "right" individual within the purchaser's organization must also be contacted to qualify as a legitimate contact thereby indicating a thorough transaction process. The right individuals typically are senior executives, such as the chairman, directors, CEO (chief executive officer), CFO (chief financial officer), or head of corporate development/acquisitions. In contrast, a flawed process may involve approaching an operating level manager whose job could be lost in a merger or a person not able to make an acquisition decision, for example, the director of shareholder relations.

Embodiments of the present disclosure can include, for example, classifying organization titles for contacts at the potential buyers to thereby determine if appropriate individuals were approached. See, e.g., item 70 in FIG. 5B. Moreover, an integrated buyers log could automate this inquiry according to an example embodiment of the present disclosure.

9. Was there sufficient follow-up with the parties?

Follow-up includes the interactions with potential buyers after the initial solicitation of interest. The intent of this line of questioning is to determine if buyers were treated fairly (i.e. was any favoritism shown and if so, why), to determine if the seller exhibited a good faith effort to encourage and facilitate reasonable information requests of potential purchasers, and to determine thoroughness (i.e. how hard did the seller try to get a purchaser to bid on the target). Follow-up with all buyers usually indicates a process is thorough. A consistent pattern of reasonable follow-up with each potential purchaser that would encourage them to prepare and submit a workable bid; a consistent pattern would be indicative of a good faith effort and fairness in the sale process. Unexplained variances in the level of follow-up between the purchasers might indicate that the process is flawed.

Embodiments of the present disclosure can include, for example, calculating a score responsive to conversations with potential buyers to thereby determine if sufficient follow-up was conducted. See, e.g., item 71 in FIG. 5B.

10. For parties not pursuing a transaction, what was the reason?

A purposeful act or purposeful inaction on the part of the seller with respect to one or more potential purchasers that discouraged the originally solicited buyer from further participating in the process could indicate that the seller did not want certain purchaser(s) to participate in the process. On the other hand, there may be a legitimate reason why the potential purchaser elected to withdraw from the process. An example of a legitimate rationale for opting out of the process is that the prospective buyer decided their existing business did not have a strategic fit with the target. Reasons that could raise suspicions of good faith would be the buyer did not believe the process would result in a sale even if they were the highest bidder or the seller cannot tell buyers the relevant information about its business. If the seller does not know what its doing in the sale process, buyers are less likely to commit resources to investigate a transaction. Post-event surveys and contemporaneous expressions may provide evidence for a non-pursuing party's reasons.

Embodiments of the present disclosure can include, for example, determining whether potential buyers did not pursue a transaction for similar reasons. See, e.g., item 72 in FIG. 5B.

11. Was the reason for not pursuing an acquisition of the company something the debtors could have rectified to make the process more competitive?

Sometime a seller cannot answer meaningful questions, in the example of the sale of a technology company in conjunction with pending litigation regarding the ownership of the target's patents. The seller may be unable to provide an educated opinion concerning the outcome and ramifications of the litigation. Any potential buyer would likely apply a discount for this uncertainty or chose not to participate as a buyer. In an example concerning a manufacturing company, buyers want to understand the pension obligations of the company in more detail although the seller refuses to provide detailed actuarial data to buyers. This would be an example of critical information in the seller's control they are not providing to potential buyers. The point of this question is to identify why buyers did not proceed to make a bid and understand if it was a factor that the seller could have influenced or was out it its control. This speaks especially to the fairness and good faith efforts of the seller.

Embodiments of the present disclosure can include, for example, determining whether one or more potential buyers' reasons for not submitting a bid could have been rectified to make the process more competitive. See, e.g., item 73 in FIG. 5B.

12. With what portion of potential buyers did the debtors obtain closure?

In the context of the sale process, closure is accomplished when the seller has received a definitive answer from solicited potential purchaser either in the form of an actual bid or made aware that the solicited party has decided to pass on the opportunity and why declined. The actual percentages indicating a thorough process are dependent on the particular industry, the number of solicitations, and other circumstances. Those skilled in the art would be able to ascertain the thoroughness for each specific situation.

Embodiments of the present disclosure can include, for example, classifying potential buyers according to whether closure was obtained. See, e.g., item 74 in FIG. 5B.

13. Can the results of the process be explained or reconciled?

This portion of the audience inquiry considers if an unexpected situation may skew the answers of the other questions. For example, if the target company were in an industry that was suffering from an economic downturn, interest in the purchase of that property might be lower than would otherwise be expected and thereby not indicate a lack of thoroughness or good faith in the process.

Embodiments of the present disclosure can include, for example, calculating a score responsive to whether results of the process can be explained or reconciled. See, e.g., item 75 in FIG. 5B.

B. Information

The information category includes rating information about the entity prepared for potential buyers; this category of questions examines the information prepared by the seller and made available to each potential purchaser. Information provided to each prospective buyer that accurately reflects all aspects of the target company, both good and bad, would be an indicator of fairness, good faith, and thoroughness. The following questions are provided as a guide to determine if the correct and necessary information was provided to the purchasers.

1. Is the information that was made available to potential buyers pursuant to a reasonable confidentiality agreement?

Most potential purchasers understand and appreciate the need for reasonable confidentiality agreements in the sales process and would likely agree to the terms of the agreement. However an overly broad and overreaching confidentiality agreement might make otherwise interested purchasers hesitant in pursuing the purchase thereby discouraging participations. As mentioned above, unnecessarily limiting potential purchasers is generally an indicator of an inadequate sales process.

Figure 6A:
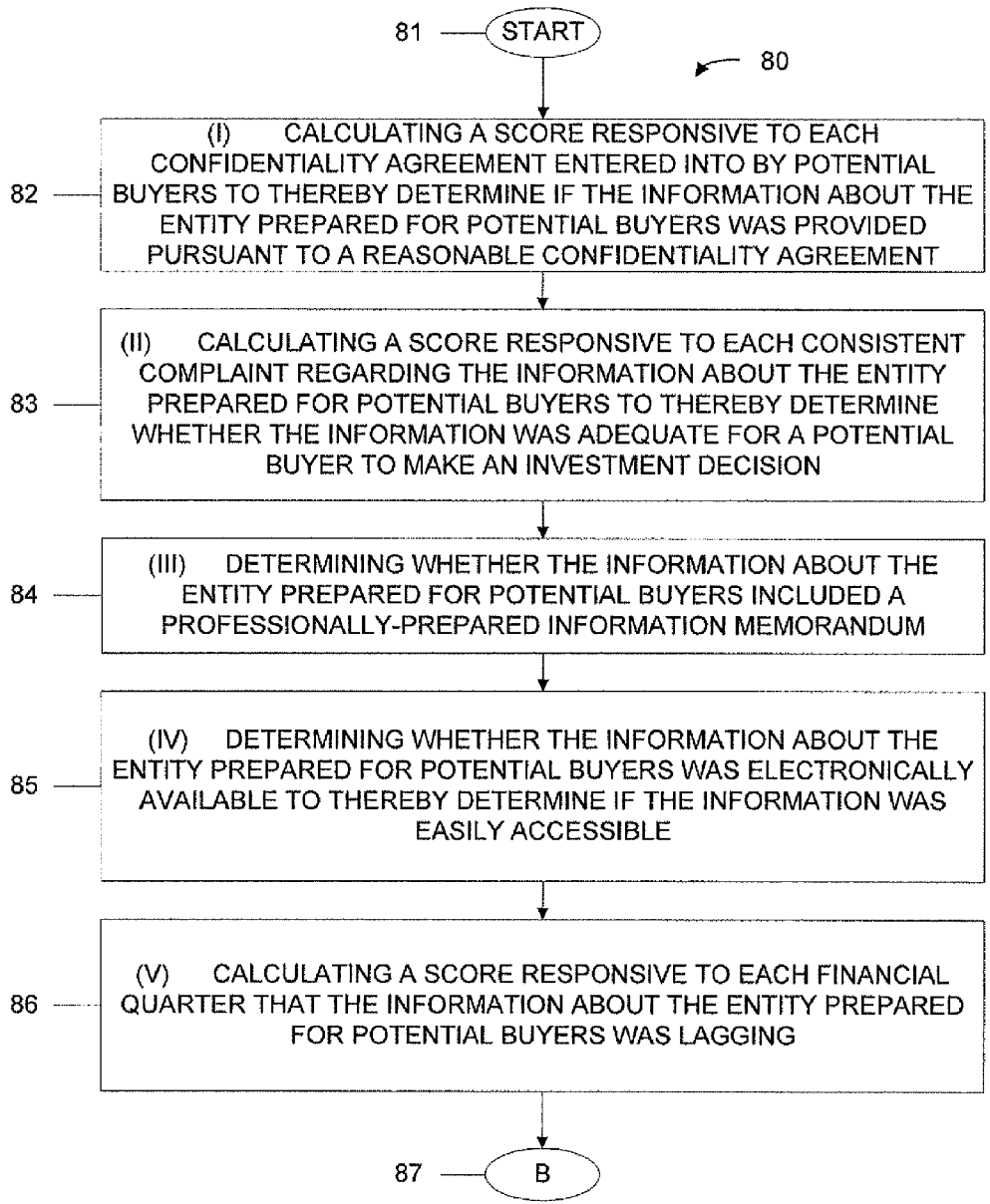
FIGS. 6A and 6B are schematic flow diagrams of a computer-implemented method of evaluating a sale of an entity according to an embodiment of the present disclosure.

Embodiments of the present disclosure can include, for example, calculating a score responsive to each confidentiality agreement entered into by potential buyers to thereby determine if the information about the entity prepared for potential buyers was provided pursuant to a reasonable confidentiality agreement. See, e.g., item 82 in FIG. 6A.

2. Was the information adequate for a company to make an investment decision?

This question checks for thoroughness of information and is meant to characterize some of the other topics in this section. Purchasers of a large target company, require careful study of all facets of the business. A meager information package can often provide a disincentive for the reasonable purchaser to continue with the sales process. Specific information provided by sellers in a good faith process typically includes: projections, balance sheet and off balance sheet liabilities, material contracts and customers, critical vendors and suppliers, detailed cost and revenue information, and title analysis of assets owned/leased/encumbered, management and labor issues assessment, among other things.

Embodiments of the present disclosure can include, for example, calculating a score responsive to each consistent complaint regarding the information about the entity prepared for potential buyers to thereby determine whether the information was adequate for a potential buyer to make an investment decision. See, e.g., item 83 in FIG. 6A.

3. Was there a professionally prepared information memorandum?

This question addresses the content of the information memorandum or other materials supplied to buyers and can be used by those skilled in the art in determining the good faith effort and thoroughness of the sales process.

Embodiments of the present disclosure can include, for example, determining whether the information about the entity prepared for potential buyers included a professionally-prepared information memorandum. See, e.g., item 84 in FIG. 6A.

4. Was the information easily accessible?

More easily accessible information enables potential purchasers to evaluate a purchase and determine if it is something that meets the needs and or mission of their business. Online and electronic data rooms, providing access to volumes of relevant data on the target company, with access limited to qualified buyers (who have executed a confidentiality agreement) are becoming more prevalent and ease administrative burdens of copying for both buyers and seller. Easier access to information generally supports the thoroughness, fairness, and good faith elements.

Embodiments of the present disclosure can include, for example, determining whether the information about the entity prepared for potential buyers was electronically available to thereby determine if the information was easily accessible. See, e.g., item 85 in FIG. 6A.

5. Was the information up to date?

Outdated or stale information that failed to properly reflect the current state of the property might discourage potential purchasers from electing to pursue the transaction, result in diminished competition, and indicate a lack of thoroughness, good faith, or fairness. A reduced number of potential purchasers that engage in the sales process can reduce the ultimate sales price and enable an insider to purchase the property at a reduced price. Use of misleading or otherwise unsubstantiated projections could also result in improper value being applied by buyers.

Embodiments of the present disclosure can include, for example, calculating a score responsive to each financial quarter that the information about the entity prepared for potential buyers was lagging. See, e.g., item 86 in FIG. 6A.

6. Were potential bidders informed of updates to the data room?

The data room contains all salient information that a potential purchaser may want to reference in deciding whether or not to purchase the property and is typically located offsite from the sales property. Thus any updates to the information stored in the data room would be of great interest to serious potential purchasers. As such, informing all purchasers of the updates also reflects fairness and good faith.

Figure 6B:
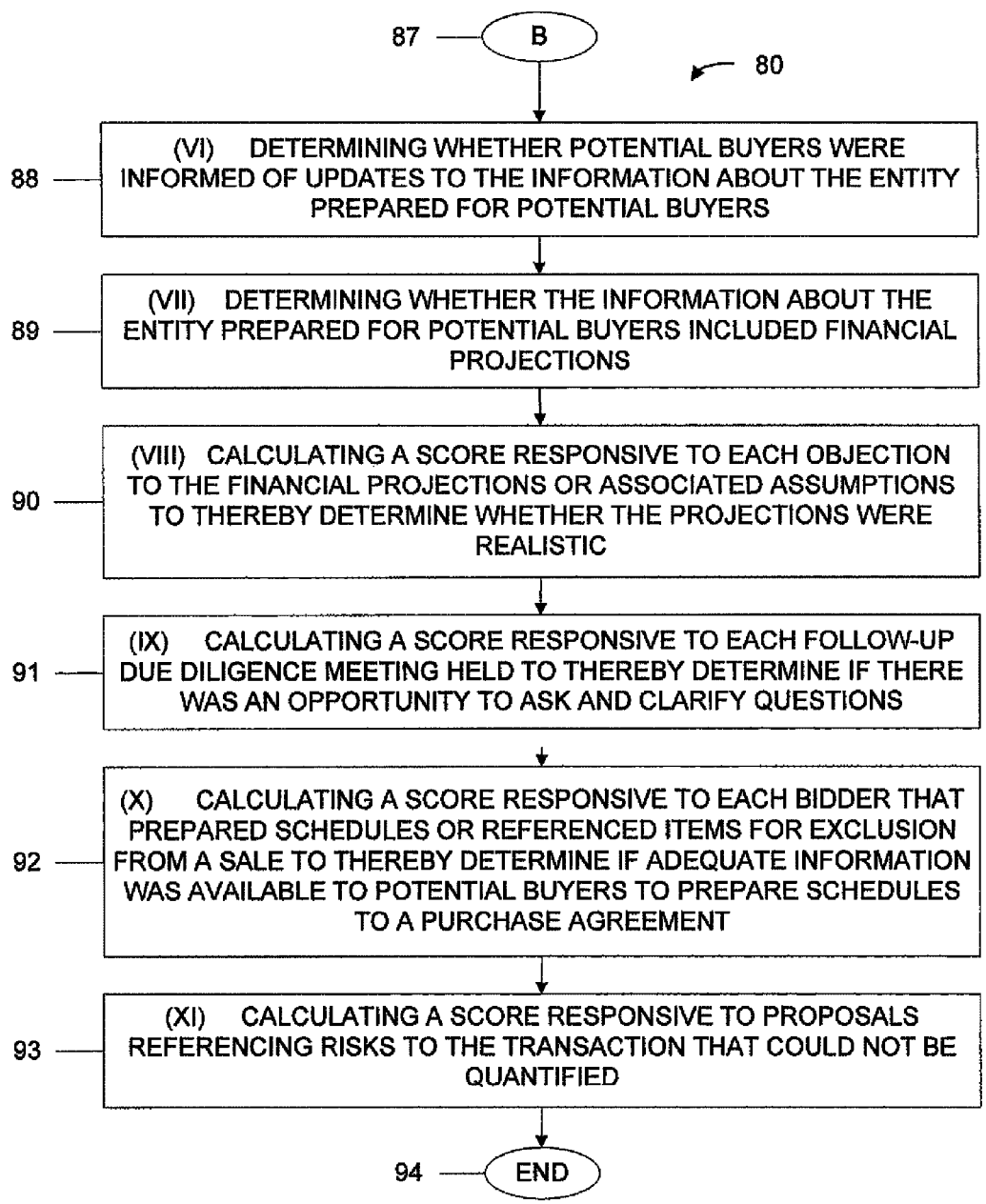

Embodiments of the present disclosure can include, for example, determining whether potential buyers were informed of updates to the information about the entity prepared for potential buyers. See, e.g., item 88 in FIG. 6B.

7. Were there financial projections?

Assuming the target company produces cash flow, indicators of future cash flows would be an important piece of information desired by likely purchasers. Thus the lack of these projections might be evidence of a process lacking good faith or thoroughness.

Embodiments of the present disclosure can include, for example, determining whether the information about the entity prepared for potential buyers included financial projections. See, e.g., item 89 in FIG. 6B.

8. Are the projections realistic and are critical assumptions substantiated?

While evaluation of these projections is somewhat subjective, reasoned opinions of how realistic they are can be developed by experts and presented to the fact finder for evaluation. Some additional questions falling under this heading might include: (a) What is management's history of making or missing projections and what caused previous variance? (b) What experience did the overall industry have on making or missing projections? (c) Do the projections imply appropriate industry metrics? Revenues should track to an industry metric such as bill per meal; win per slot machine per day, sale price per ounce of gold. (d) Do capital expenditure projects provide industry normative returns? (e) How do projections prepared by management compare with assumptions used by third parties, such as research analysts, industry consultants, competitors, and other sources? (f) Are the projections mathematically correct and/or is there double counting of certain items? These questions address the thoroughness and good faith aspects of the projections.

Embodiments of the present disclosure can include, for example, calculating a score responsive to each objection to the financial projections or associated assumptions to thereby determine whether the projections were realistic. See, e.g., item 90 in FIG. 6B.

9. Was there an opportunity to get clarification and follow-up questions answered?

Here again the inquiry focuses on the ability of the potential purchaser to acquire information regarding the property to be sold. Instances of free flowing readily available information are indicative of good faith and thoroughness.

Embodiments of the present disclosure can include, for example, calculating a score responsive to each follow-up due diligence meeting held to thereby determine if there was an opportunity to ask and clarify questions. See, e.g., item 91 in FIG. 6B.

10. Is there adequate information available for parties to prepare schedules to a purchase agreement?

Quite often the sale of a company is made up of multiple components that the buyer must be aware of before submitting his or her purchase agreement. These components are usually references by buyer and seller in a stock or asset purchase agreement that covers assets and liabilities included and excluded in the deal and specific representations and warranties concerning the sale and the companies involved. For example, the information can include: a list of material contracts, a list of all vendors, a list of pending or threatened litigation, and any known claims. For the process to be fair, all potential buyers need to be bidding with the same access to information. To compare values provided by various buyers, bids need to reflect the same information and have similar terms or otherwise be reconcilable, subject to adjustment. Failure to provide information for the relevant schedules can indicate lack of fairness and good faith.

Embodiments of the present disclosure can include, for example, calculating a score responsive to each bidder that prepared schedules or referenced items for exclusion from a sale to thereby determine if adequate information was available to potential buyers to prepare schedules to a purchase agreement. See, e.g., item 92 in FIG. 6B.

11. Were risks to the sales transaction present that could not be quantified or otherwise meaningfully evaluated?

Asking this question might explain why few sales solicitations of the target company were, in spite of a good faith, fair and thorough effort to shop the business. Examples of such risk include the threat of regulatory change and its impact on the target company. For example, when selling a casino in one state, the value of the target could be impacted by legislative moves towards legalizing gambling in a major metropolitan area of an adjoining state.

Embodiments of the present disclosure can include, for example, calculating a score responsive to proposals referencing risks to the transaction that could not be quantified. See, e.g., item 93 in FIG. 6B.

12. Was the business positioned in a favorable light?

This question focuses on the presentation and packaging of information provided to the potential purchasers, i.e. is the information content and presentation enticing or discouraging to buyers. For example, if the information identifies growth opportunities, presents ways to improve the business, or highlights any competitive advantage the business enjoys—this more than likely entices interest in the purchase of the property and fosters competitiveness. Conversely if the information focused on the negative aspects of the property, this obviously would be somewhat discouraging to potential buyers. Undue discouragement is a factor that would indicate a lack of good faith and inadequate process, manifesting itself in reduced competition.

C. Timing

The timing category includes rating time frames surrounding the sale. Analyzing the timing of the sales process and the timing of some of the steps of the sales transaction can ferret out some instances of unfair dealings on the part of the seller. The following questions examine the timetable of the entire sales process by analyzing the incremental timing of some of the individual steps.

1. Was there adequate time to negotiate a confidentiality agreement?

A determination if adequate time was available to negotiate a confidentiality agreement is dependent upon the circumstances of the sale itself. However it will be appreciated that those skilled in the art are capable of ascertaining if the allotted time was adequate. If adequate time was not allowed for this negotiation, it might indicate that the seller was trying to avoid dealing with that particular potential purchaser and indicate a flawed process that cannot be depended on to provide a relevant indication of market value.

Figure 7A:
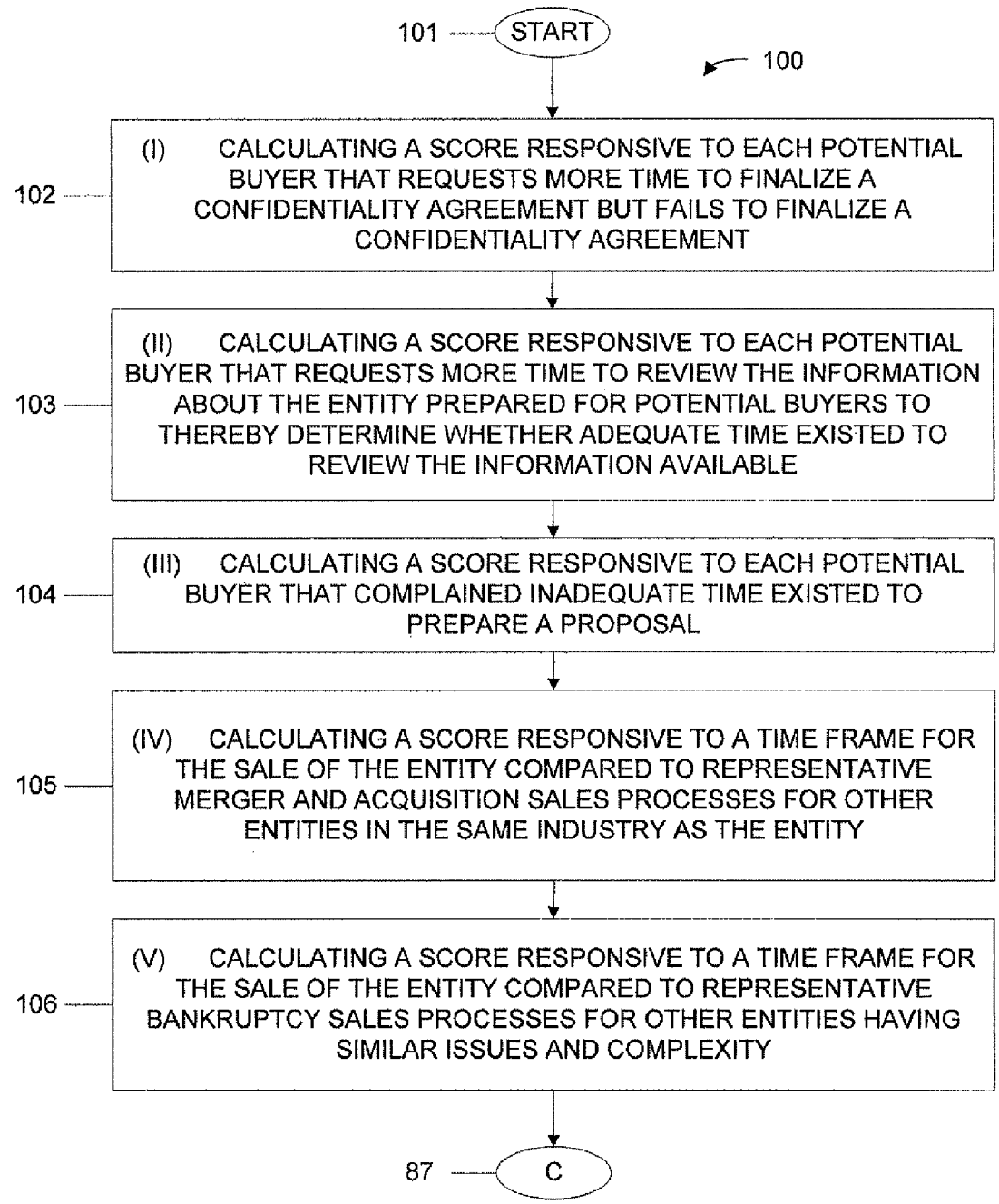
FIGS. 7A and 7B are schematic flow diagrams of a computer-implemented method of evaluating a sale of an entity according to an embodiment of the present disclosure.

Embodiments of the present disclosure can include, for example, calculating a score responsive to each potential buyer that requests more time to finalize a confidentiality agreement but fails to finalize a confidentiality agreement. See, e.g., item 102 in FIG. 7A.

2. Was there adequate time to review the information available?

This inquiry is very similar to the question of the time to negotiate a confidentiality agreement in that the determination of adequate time is circumstance dependent and that a lack of adequate time might be indicative of a lack of good faith, fairness, or thoroughness Embodiments of the present disclosure can include, for example, calculating a score responsive to each potential buyer that requests more time to review the information about the entity prepared for potential buyers to thereby determine whether adequate time existed to review the information available. See, e.g., item 103 in FIG. 7A.

3. Was there adequate time for the buyer to prepare a bid and interested party or sellers to review bids?

In order for a reasonable bid to be prepared that satisfies a fairness inquiry, a certain amount of time is required likewise for review of bids. The amount of time required depends on the facts and circumstances of the particular bid, but can be determined by those skilled in the art. Adequate time ensures competitiveness can occur.

Embodiments of the present disclosure can include, for example, calculating a score responsive to each potential buyer that complained inadequate time existed to prepare a proposal. See, e.g., item 104 in FIG. 7A.

4. What was the time allowed for this process versus the merger and acquisition process for other companies in the industry of the target?

Merger, acquisition, and divestiture process timetables are often similar within a given industry. Some industries have copious amounts of acquisition activity that are efficiently transacted by leveraged buy out firms, examples include natural gas distributors, video store chains, and cable systems. Other businesses, however, require longer time frames for the same process, such as industries where more parties may be involved in completing a transaction, including labor unions or regulatory bodies. While this is a fact dependent inquiry, qualified analysts are capable of ascertaining if the time of the overall process comports with the time of target companies in the same or similar industries. This can be used as a benchmark to evaluate the good faith and thoroughness of the seller's process.

Embodiments of the present disclosure can include, for example, calculating a score responsive to a time frame for the sale of the entity compared to representative merger and acquisition sales processes for other entities in the same industry as the entity. See, e.g., item 105 in FIG. 7A.

5. What was the timing of this process versus those for other target companies in similar situations (Chapter 11, distress or non-distressed) with comparable issues and complexity?

This is another benchmark analysis useful for determining if a sales process occurs within a reasonable amount of time. If a sale were to occur too quickly, likely purchasers may not have sufficient time in order to analyze the situation and decide if such a purchase would be beneficial. Conversely, if the time of a sales process exceeded an expected time frame, potential purchasers might become less inclined to participate in the transaction and therefore disengage themselves.

Embodiments of the present disclosure can include, for example, calculating a score responsive to a time frame for the sale of the entity compared to representative bankruptcy sales processes for other entities having similar issues and complexity. See, e.g., item 106 in FIG. 7A.

6. Were there any seasonal issues that could affect the marketing process?

The purchase activity of some industries cycles could impact the sale price or timing of the property if it is in a seasonally dependent industry. For example, most boats are sold to dealers at trade shows early each year. The manufacture then makes the boats and delivers them to the dealers who sell them in late spring or summer Buyers would want to position the new company's products prior to the boat shows. Otherwise, they are buying a business with already booked revenues for the current year and cannot manage new products for a considerable period. Considering the seasonal issues a company faces in the context of a sale can help reconcile the results of a sale process. The presence of a seasonal issue is a mitigating factor that could mitigate a determination of an unfair sale process.

Figure 7B:
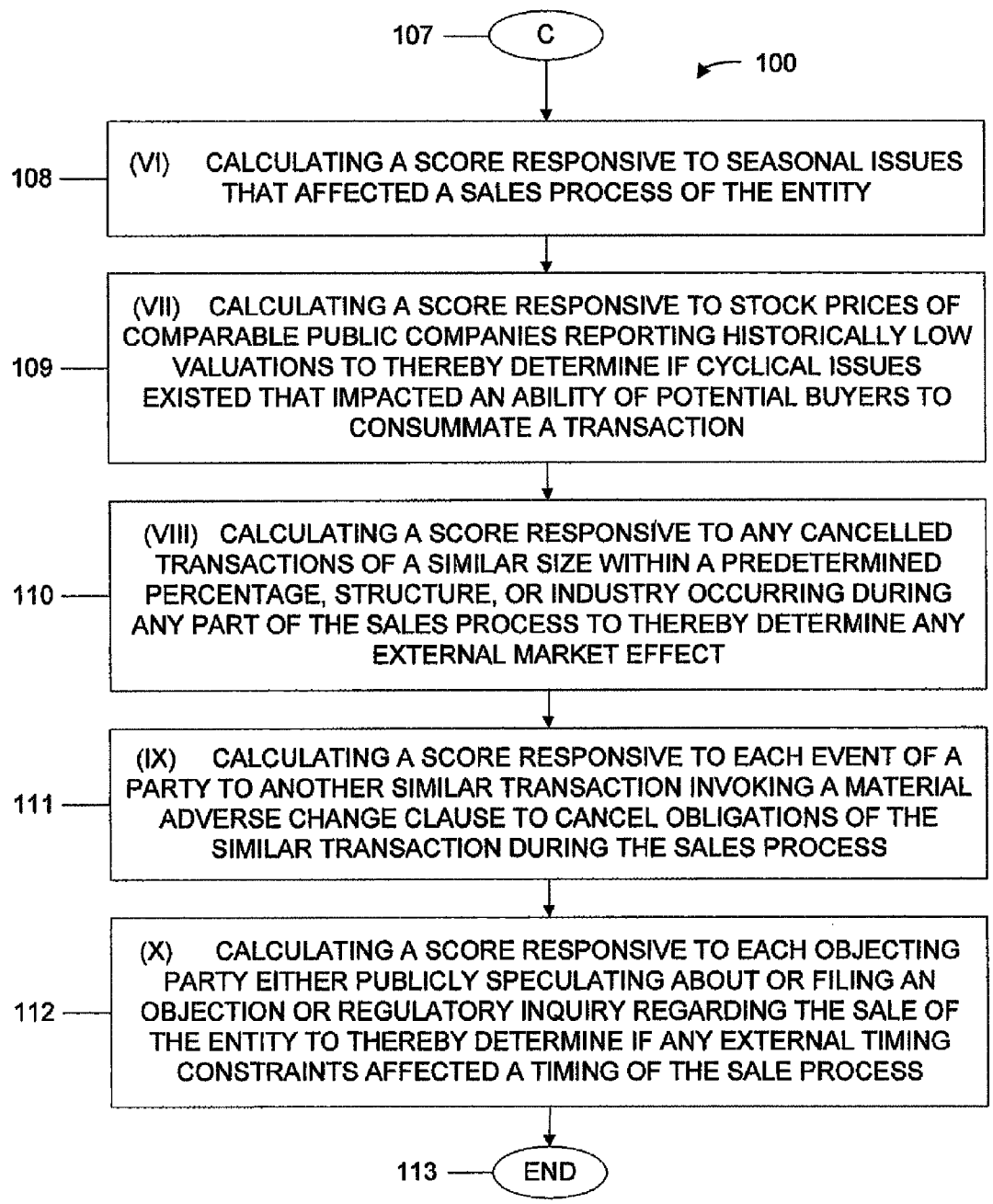

Embodiments of the present disclosure can include, for example, calculating a score responsive to seasonal issues that affected a sales process of the entity. See, e.g., item 108 in FIG. 7B.

7. Are there cyclical issues that could impact ability of strategic buyers to consummate a transaction?

An industry downturn may adversely impact the financial wherewithal of virtually all buyers. For example, in the steel industry, there have been periods when the preponderance of transactions was conducted through Chapter 11 plans and asset sales. The logical strategic buyers were experiencing poor performance for the same reasons the target companies were for sale. Understanding the industry cycle can provide insight into the good faith, fairness, and thoroughness of a sale process as well as the ultimate determination of whether the price derived through sale is in fact market value.

Embodiments of the present disclosure can include, for example, calculating a score responsive to stock prices of comparable public companies reporting historically low valuations to thereby determine if cyclical issues existed that impacted an ability of potential buyers to consummate a transaction. See, e.g., item 109 in FIG. 7B.

8. Was any part of the solicitation conducted during a period when other transactions in the marketplace were cancelled?

Cancelled transaction could be due to a sudden downturn in the economy due otherwise unpredicted events, such as the Sep. 11, 2001 terrorist attacks in the United States. Such a situation can mean that soliciting buyers is not likely to yield meaningful results. The market is effectively closed. This is another inquiry that can explain an otherwise unreasonable sales price but may indicate inadequacy of process to reflect true market value of the target. The presence of such cancelled transaction is a mitigating factor that could mitigate a determination of an unfair sale process.

Embodiments of the present disclosure can include, for example, calculating a score responsive to any cancelled transactions of a similar size within a predetermined percentage, structure, or industry occurring during any part of the sales process to thereby determine any external market effect. See, e.g., item 110 in FIG. 7B.

9. During the process, did any parties in other similar transactions invoke material adverse change clauses to cancel their obligations?

This is a follow-up question to asking if other transactions similar to the one at hand were cancelled. Invoking a material adverse change indicates either change in market conditions (e.g. Sep. 11, 2001), change in industry conditions (nationwide strike in an industry), or change at a company (factory breakdown and work stoppage). Also, parties may invoke a material adverse change and use this as a reason, real or not, as an excuse to back out of a commitment to complete a transaction. This may result in diminished competition and, depending on the circumstances, diminished good faith.

Embodiments of the present disclosure can include, for example, calculating a score responsive to each event of a party to another similar transaction invoking a material adverse change clause to cancel obligations of the similar transaction during the sales process. See, e.g., item 111 in FIG. 7B.

10. Were there timing constraints beyond the seller's control that drove the timing of the sale process?

Examples of some of the timing constraints considered here include regulatory timing and financial. Here again, the focus with this particular question is to see if some external factors might have affected the sales process that might have to be accounted for in evaluating the adequacy of the overall process.

Embodiments of the present disclosure can include, for example, calculating a score responsive to each objecting party either publicly speculating about or filing an objection or regulatory inquiry regarding the sale of the entity to thereby determine if any external timing constraints affected a timing of the sale process. See, e.g., item 112 in FIG. 7B.

D. Transfer

This category includes rating circumstances associated with a transfer of the entity. In some instances, as reflected in the questions listed below, some difficulties may be present that can hinder the actual transfer of the target company to the purchaser. However these difficulties can often be overcome with some effort on the part of the seller or buyer. In a situation lacking good faith or thoroughness, the seller may present information focusing on the difficulties without divulging how these difficulties might be overcome. This would discourage a vigorous bidding by all prospective purchasers who are not aware it is possible to overcome these difficulties. The following questions can elucidate the issues that may block the transaction and what reasonable steps can be taken to circumvent any such impasse.

1. Can the seller describe a way by which to deliver the asset to potential buyers?

This question seeks to determine if the seller has made a good faith attempt to circumvent the aforementioned obstacle of a smooth sale, thereby providing some evidence that the seller has no buyer preferences. An example of a good faith attempt might occur if the seller can develop a plan to cram down a specific class of creditors in a bankruptcy sale plan or to seek a court order to circumvent a shareholder agreement. A sales process may lack good faith if the seller cannot design or structure a transaction and develop some consensus in which to transfer the property.

Figure 8A:
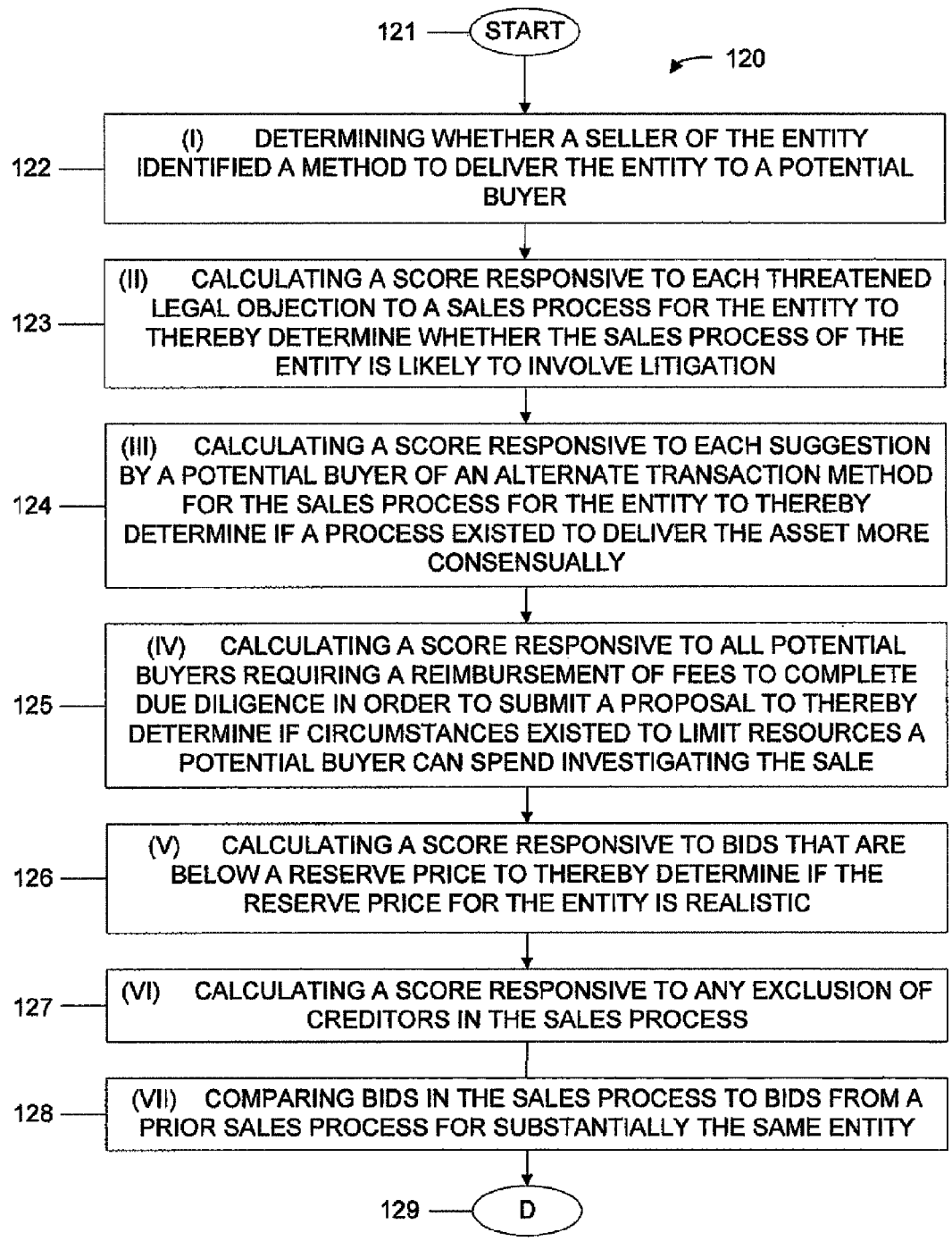
FIGS. 8A and 8B are schematic flow diagrams of a computer-implemented method of evaluating a sale of an entity according to an embodiment of the present disclosure.

Embodiments of the present disclosure can include, for example, determining whether a seller of the entity identified a method to deliver the entity to a potential buyer. See, e.g., item 122 in FIG. 8A.

2. Is the acquisition process likely to involve significant litigation?

Acquisitions in bankruptcy usually involve litigation by a creditor or equity committee. Other non-bankruptcy sales may involve antitrust litigation or tortuous interference claims by a jilted buyer. Fairness and good faith in the situation depends on the parties to the litigation and other factors. A potential buyer could use its litigation against the target as a method to scare off other bidders and minimize competition. Third-party litigation may deter bidders to the extent they do not understand it. A good faith effort on the seller's part often requires demonstrating a way to solve these issues as part of a sale of the target.

Embodiments of the present disclosure can include, for example, calculating a score responsive to each threatened legal objection to a sales process for the entity to thereby determine whether the sales process of the entity is likely to involve litigation. See, e.g., item 123 in FIG. 8A.

3. Is there a process to deliver the asset more consensually?

This question investigates if the seller has opted for a reasonable transfer thereby making the acquisition more attractive to all prospective purchasers. One example of a more consensual transfer might be a pre-negotiated chapter 11 plan where creditors agree on a plan to sell the assets of the property to the buyer. Evidence of a seller developing or indicating a more consensual manner to deliver the entity to a potential purchaser is an example of a good faith attempt to execute an adequate sale process.

Embodiments of the present disclosure can include, for example, calculating a score responsive to each suggestion by a potential buyer of an alternate transaction method for the sales process for the entity to thereby determine if a process existed to deliver the asset more consensually. See, e.g., item 124 in FIG. 8A.

4. Are there circumstances that might limit the resources a potential buyer may spend investigating an acquisition?

The answer often exhibits the reasons for the amount and type of competition in a process. For example, the most likely buyer could have been resource constrained because at the time of the target's auction the likely buyer was closing on another acquisition and lacked the "bandwidth" to pursue multiple acquisitions simultaneously.

Embodiments of the present disclosure can include, for example, calculating a score responsive to all potential buyers requiring a reimbursement of fees to complete due diligence in order to submit a proposal to thereby determine if circumstances existed to limit the resources a potential buyer can spend investigating the sale. See, e.g., item 125 in FIG. 8A.

5. Is there a "reserve price," and is it realistic?

If the seller communicates it has unrealistically high expectations, buyers probably will be less included to devote time investigating the purchase of target. If the price is too low they may view the opportunity with skepticism. However, buyers would more likely be enticed with too low of a reserve price rather than too high. Usually the seller sets the reserve price, but sometimes (for example in the sale of a distressed business or company in Chapter 11) creditors would rather own the target company themselves than obtain take a recovery less than their reserve price.

Embodiments of the present disclosure can include, for example, calculating a score responsive to bids that are below a reserve price to thereby determine if the reserve price for the entity is realistic. See, e.g., item 126 in FIG. 8A.

6. Were creditors or other constituencies included in the solicitation process?

Often when selling a distressed company, members of the creditor class who will are apt to receive only a fraction of what is owed to them participate in the sale process to observe and attempt to negotiate a better purchase price. This added scrutiny reduces the likelihood of financial mischief and is often an indicator of good faith. Other constituencies consulted on the sale process could be a union, bank lender, preferred stockholder, or others consulted on a sale. Specifically, these are parties that could otherwise upset or delay a sale.

Embodiments of the present disclosure can include, for example, calculating a score responsive to any exclusion of creditors in the sales process. See, e.g., item 127 in FIG. 8A.

7. Has the company been shopped before and what happened if it was? If the target company was previously put up for sale, it is likely a transaction was not completed. Understanding why the previous sale was not completed can be helpful to those skilled in the art in determining how the target's sale process will be perceived the second time around.

Embodiments of the present disclosure can include, for example, comparing bids in the sales process to bids from a prior sales process for substantially the same entity. See, e.g., item 128 in FIG. 8A.

8. Are the criteria for evaluating acquisition proposals clear to potential buyers?

These criteria are usually highest and best offer (actually "bid"), where highest is measured as economic consideration or value. Cash is easy to value but if securities are offered as consideration investment bankers will usually analyze value of various proposals. Determining what is "best" is often a more subjective task. For example, "best" may include a settlement with labor or provide certainty to other constituencies in a transaction. Clear communications of the rules for evaluating higher and better (or whatever criteria are applied) are indicators of a competitive and good faith effort. Communicating the common criteria equally to all participants is an indicator of fairness.

Figure 8B:
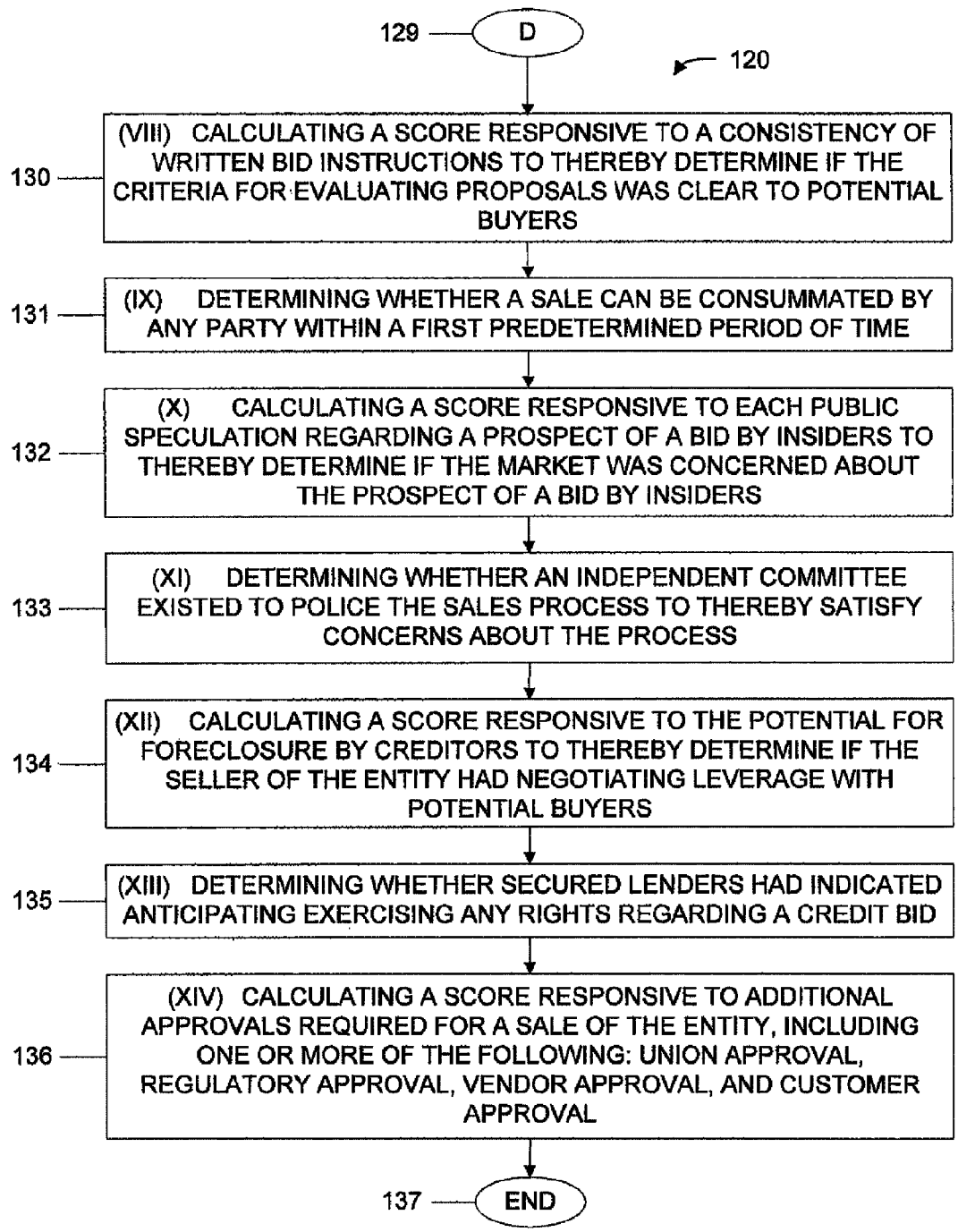

Embodiments of the present disclosure can include, for example, calculating a score responsive to a consistency of written bid instructions to thereby determine if the criteria for evaluating proposals was clear to potential buyers. See, e.g., item 130 in FIG. 8B.

9. What is the likely timing to consummate an acquisition?

Timing to consummate purchase can be important to buyers, especially in an uncertain environment. Having no unnecessary delay between selection of winner in an auction and consummation is an important demonstration of good faith and thoroughness. Similarly, fairness issues need to be considered if timing to close is different for different parties. This also impacts the criteria of competitiveness.

Embodiments of the present disclosure can include, for example, determining whether a sale can be consummated by any party within a first predetermined period of time, e.g., within six months. See, e.g., item 131 in FIG. 8B.

10. Was the market concerned about the prospect of a bid by insiders?

As is well known, evidence of concern in the market about insider bids, even if unfounded, would chill competition by buyers for the target and likely depress value of bids by third parties. Affirmative responses to this question would cast serious doubt on the good faith efforts of the seller.

Embodiments of the present disclosure can include, for example, calculating a score responsive to each public speculation regarding a prospect of a bid by insiders to thereby determine if the market was concerned about the prospect of a bid by insiders. See, e.g., item 132 in FIG. 8B.

11. Was the seller able to satisfy market concerns about the process being unfair?

Concerns about fairness or good faith process can emanate from the possibility of an insider bid who has an advantage knowing what other parties were bidding and the bid amounts. To mitigate insider bids, some sellers can establish an independent committee that evaluates bids and runs the sale process. Thus, sellers taking such action would be an indication of a good faith effort and fairness to non-inside bidders.

Embodiments of the present disclosure can include, for example, determining whether an independent committee existed to police the sales process to thereby satisfy concerns about the process. See, e.g., item 133 in FIG. 8B.

12. Did the sellers have any negotiating leverage with potential buyers?

The knowledge of negotiating leverage on the part of the seller enhances their selling position, which can be an indicator of an adequate sales process. Examples of limited negotiating leverage might include a company with dwindling financial resources or when only a few potential purchasers are pursuing the purchase. Exercising negotiating leverage can be viewed through competition among buyers.

Embodiments of the present disclosure can include, for example, calculating a score responsive to the potential for foreclosure by creditors to thereby determine if a seller of the entity had negotiating leverage with potential buyers. See, e.g., item 134 in FIG. 8B.

13. What position have secured lenders taken regarding a credit bid?

Secured lenders have the following general alternatives: (1) Support the transaction through voting and lock-up agreements binding support for the sale. This would be an indication of an adequate process. (2) Merely having advisors observing the process but no formal commitment. The determination of adequacy needs to be analyzed more specifically as to good faith, fairness, and thoroughness. (3) Objecting to sale saying it was not a fair process or value is too low. This could be an indication of an inadequate process, or the objectors could be trying to extract nuisance value in the sale process. (4) Asserting the secured lender's right to credit bid (which may deter potential buyer interest). This scenario needs to be analyzed specifically as to good faith, thoroughness, and fairness.

Embodiments of the present disclosure can include, for example, determining whether secured lenders had indicated anticipating exercising any rights regarding a credit bid. See, e.g., item 135 in FIG. 8B.

14. Are there critical aspects of the sale that are beyond the seller's control?

Answers to this question can help understand if extenuating circumstances might make an otherwise inadequate process seem more adequate. Examples of things not within the seller's control are: union approval, regulatory approval, vendor approval, and customer approval.

Embodiments of the present disclosure can include, for example, calculating a score responsive to additional approvals required for a sale of the entity, including one or more of the following: union approval, regulatory approval, vendor approval, and customer approval. See, e.g., item 136 in FIG. 8B.

15. What was the level of intensity with which the seller negotiated the sale terms?

A highly intense series of negotiations in a sale process generally fosters competition indicate good faith a more thorough process and supports the conclusion that the process yields a true indicator of market value. On the other hand, a lackadaisical process where the seller/agent did not follow up promptly with buyers or was negative on the process is flawed and cannot be relied on to provide a meaningful view of market value. A level of intensity can be quantified, for example, by: (1) a number of parties; (2) a number of drafts or proposals or counter-proposals; (3) tone, as evidenced by threats to cancel talks or changes in the lead bidder; and (4) a number of different disciplines of professionals negotiating for each party. For example, an intense negotiation can include, in addition to the buyers and sellers, tax professionals, regulatory professionals, merger and acquisition professionals, bankruptcy professionals, and other professional from different disciplines as understood by those skilled in the art.

E. Negotiation

This category includes rating a negotiation process associated with the sale of the entity. Analyzing the interaction between the seller and prospective purchasers during the negotiation stage can yield insight regarding the competitiveness of the sales process. The following questions focus on the interaction during this phase of the sales process and how actions or inactions during this phase can identify the aspects of competition, fairness, good faith and thoroughness.

1. What evidence is there that the sellers attempted to get parties to improve their proposals?

Typically in a competitive bidding process investment bankers will tell buyers if they are in a position to win or not and might describe what changes must be made to the bid in order to remain in contention in the bidding process, e.g. increase the bid by 10%, and/or change the survival period for representations and warranties. Facilitating competitive bidding by negotiating with bidders shows competition and is also an indicator of a good faith effort.

Figure 9:
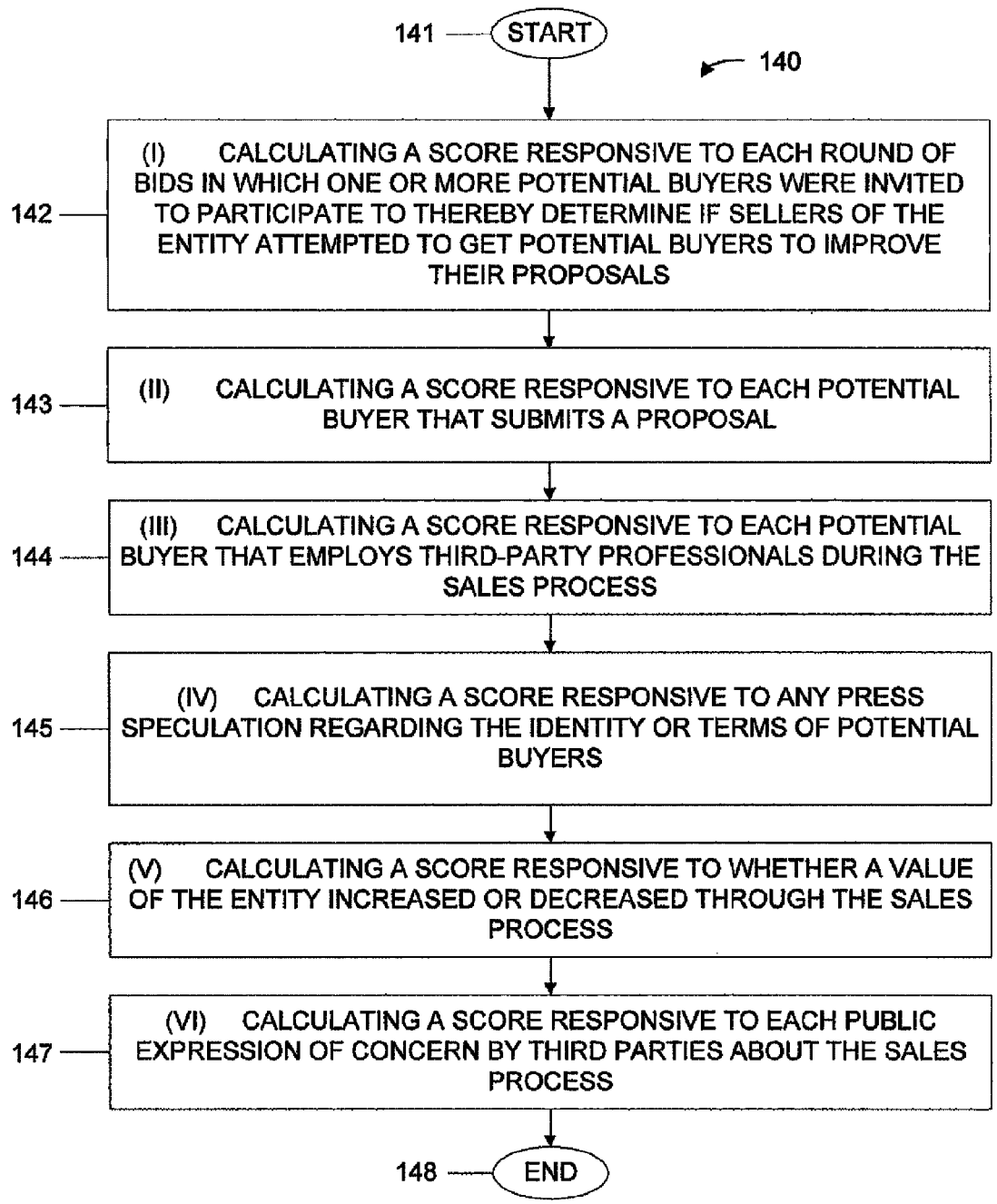
FIG. 9 is a schematic flow diagram of a computer-implemented method of evaluating a sale of an entity according to an embodiment of the present disclosure.

Embodiments of the present disclosure can include, for example, calculating a score responsive to each round of bids in which one or more potential buyers were invited to participate to thereby determine if a seller of the entity attempted to get potential buyers to improve their proposals. See, e.g., item 142 in FIG. 9.

2. How many parties expressed interest in a transaction?

Generally, the larger the number of parties that express interest in participating in the transaction, the more competitive the process is likely to be. Competition often results in greater pressure on the target to conduct a good faith sale process. It can be appreciated that this determination is well within the capabilities of those skilled in the art.

Embodiments of the present disclosure can include, for example, calculating a score responsive to each potential buyer that submits a proposal. See, e.g., item 143 in FIG. 9.

3. What parties were involved in communicating with the prospective buyers?

Generally investment bankers are more experienced in company sales than management of the company itself. Also, investment bankers can be more objective and are less likely to have a personal agenda versus a manager. Thus investment banker communication would be an indicator of a good faith effort. Further, in the case of a sale in bankruptcy, the target and its bankers should have their own or supplemental legal expertise experienced in handling sales of this matter in order to demonstrate good faith and thoroughness.

Embodiments of the present disclosure can include, for example, calculating a score responsive to each potential buyer that employs third-party professionals during the sales process. See, e.g., item 144 in FIG. 9.

4. Did the media speculate about the identity or terms of potential buyers?

Fairness in this situation depends on the reputation of the potential buyers. For example, if there is a perception in the marketplace that the potential buyers are weak, then other purchasers may be attracted to overbid weaker parties. This situation could then result in a more adequate sale process as competition becomes more vigorous.

Embodiments of the present disclosure can include, for example, calculating a score responsive to any press speculation regarding the identity or terms of potential buyers. See, e.g., item 145 in FIG. 9.

5. In general, was the value of the company increasing or decreasing through the solicitation process?

This question can be used as in conjunction with disclosure on changing circumstances to determine whether competition should be increasing or decreasing.

Embodiments of the present disclosure can include, for example, calculating a score responsive to whether a value of the entity increased or decreased through the sales process. See, e.g., item 146 in FIG. 9.

6. Did third parties express concern about the fairness of the process?

Answers to this question comment on the perception of fairness of the process, and as mentioned above, a process that is perceived to be unfair is predisposed to producing results that are not indicative of market value.

Embodiments of the present disclosure can include, for example, calculating a score responsive to each public expression of concern by third parties about the sales process. See, e.g., item 147 in FIG. 9.

7. Did the sellers have time and leverage to negotiate the proposal?

The time required to negotiate a proposal will vary with each sales process; however, it is within the capabilities of those having the requisite skill in the art to determine if sufficient time was available to the sellers to negotiate. Knowing if the seller had ample time to negotiate the best price, or for whatever reason had insufficient time for such negotiation, might help explain why a process with poor results (i.e. low value) could still be adequate.

8. How many rounds of bidding occurred and did the proposals improve or not?

In most processes there is at least one round where all prospective purchasers are invited to submit proposals. The seller than selects finalists and asks them to improve or otherwise clarify their bids for a final selection. Sometimes at the "final" selection, the seller will tell the winning bidder to complete their documentation but not tell any other bidder yet that they did not win (in the event first place becomes or unreasonable in demands or is otherwise unable/unwilling to close). Accordingly, if all bidders were afforded a chance to improve their bids, this points to a level playing field during the bidding process and provides the opportunity for competition.

9. How did the seller's circumstances change during the solicitation process?

If during the negotiation process the seller's circumstances changed such that the value of the target significantly increased, a lack of disclosure would indicate a lack of good faith and that the process was not adequate. Timely disclosure to potential buyers of changed circumstances is a demonstration of good faith. Who is told and when is an indicator of fairness.

10. Was there a sense in the market that multiple parties were participating in the process?

As noted above, the presence of multiple bidders typically provides a sentiment of a good faith effort. Moreover, knowing other bidders are participating in the sales process would most likely cause the bidders that are serious about purchasing the property to submit more competitive (i.e. higher) bids, which necessarily produces an adequate process. Accordingly a sense of multiple parties is an indicator of an adequate process.

11. If an insider of the target is trying to buy the target, how was information flow about the process managed by the sellers?

The intent of this query is to determine the fairness of the process by examining if all potential purchasers received the same amount and detail of information, including the insider. As is known, equal knowledge of the subject property among the potential purchasers is necessary for a fair sale process. An insider receiving information on the status of other bidders' proposals can be detrimental to competition.

12. Did the market know or expect insiders to be bidders?

Knowledge of potential purchasers who are also insiders can chill prospective bidders, and since more bidders necessarily result in a more fair process, chilling the bidding process can inhibit the ability to conclude the process is competitive.

F. Execution

This category includes rating efforts associated with an execution of the sale. Execution refers primarily to the activities of the party selling the target company. The phases of the execution may be generally categorized as preparation for sale, identifying and soliciting buyers, facilitating buyer due diligence, guiding buyers to prepare preliminary bids, negotiating final bids, transaction documentation, and consummation.

1. How rigorous was follow-up with buyers?

The follow-up stage of the transaction describes the seller's response to the prospective purchaser's requests for supplemental data or other questions about the property and/or the transaction itself. Prompt and attentive responses to the purchaser's inquiries generally enhance the ultimate bid figures and in turn suggest a more thorough and good faith effort.

Figure 10:
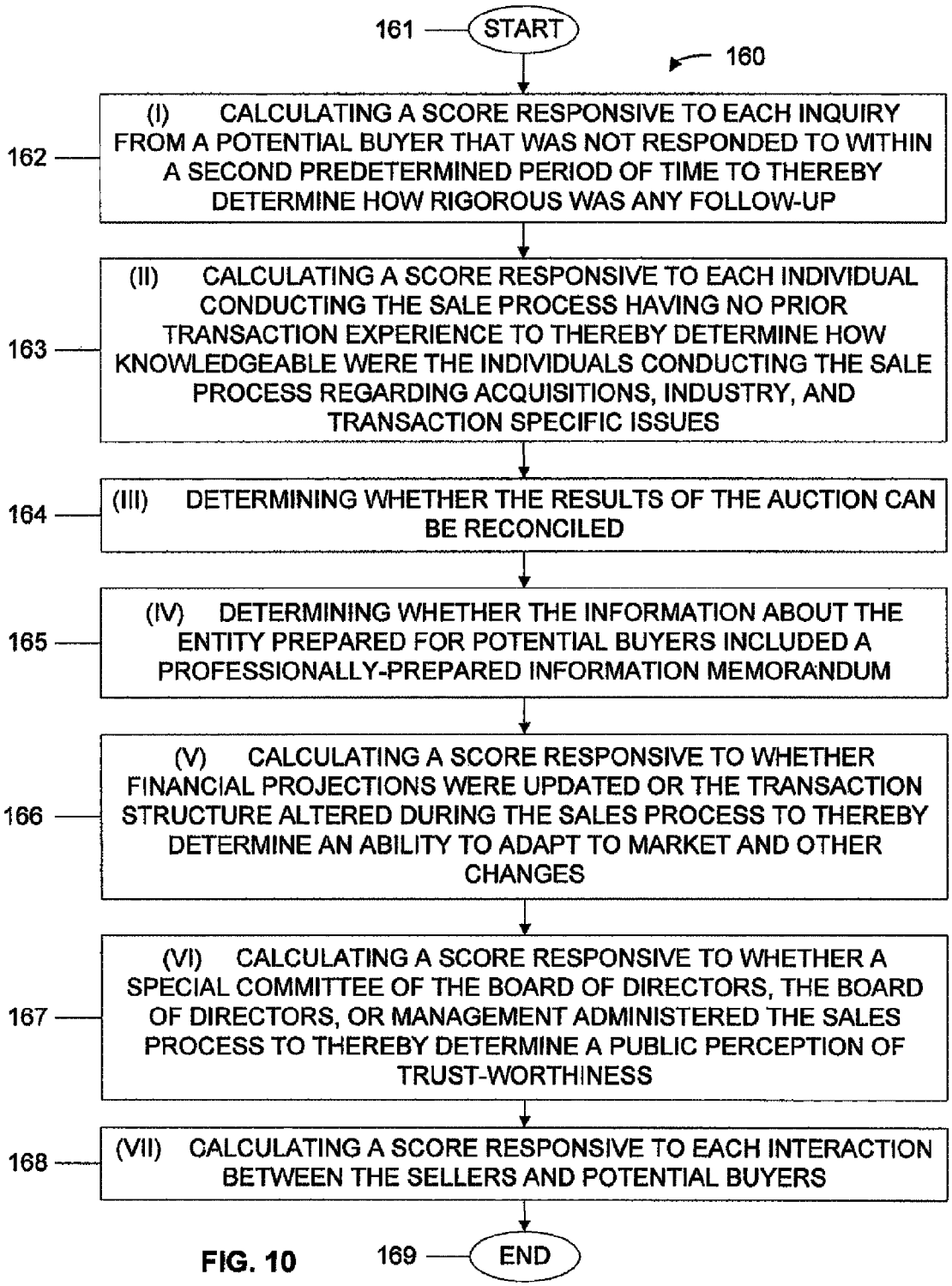
FIG. 10 is a schematic flow diagram of a computer-implemented method of evaluating a sale of an entity according to an embodiment of the present disclosure.

Embodiments of the present disclosure can include, for example, calculating a score responsive to each inquiry from a potential buyer that was not responded to within a second predetermined period of time, e.g., within 48 business hours, to thereby determine how rigorous was any follow-up. See, e.g., item 162 in FIG. 10.

2. How knowledgeable were the professionals conducting the sale process regarding issues surrounding the transaction?

This question specifically queries the experience of the particular sales personnel in mergers and acquisitions or restructuring. In particular, the historical experience of completing transactions and familiarity with the issues presented in the particular transaction can be relevant to determining the ability of the seller to make a good faith effort by accommodating buyers on transaction structure and process.

Embodiments of the present disclosure can include, for example, calculating a score responsive to each individual conducting the sale process having no prior transaction experience to thereby determine how knowledgeable were the individuals conducting the sale process regarding acquisitions, industry, and transaction specific issues. See, e.g., item 163 in FIG. 10.

3. Could the results of the auction be reconciled?

By examining the purchaser's log, one should be able to ascertain the perception of the target company in the minds of the potential purchasers. For example, if the larger strategic purchaser believed the target company is too small (in a concentrated industry) then the most likely candidates would be smaller companies; but financing for these parties may be an issue. There is often some consistency in why bidders do not proceed. It then becomes fact dependent to determine if why they did not proceed was a good reason (i.e. not due to lack of fairness, good faith, or thoroughness in the process) instead of a reason due to the process being flawed (e.g. a process lacking in good faith, perhaps where management is not cooperative in information requests to buyers who are perceived to be likely to terminate many of the employees to take advantage of synergies).

Embodiments of the present disclosure can include, for example, determining whether the results of the auction can be reconciled. See, e.g., item 164 in FIG. 10.

4. Was the Information Memorandum professionally prepared?

The information memorandum is usually prepared by the seller's investment banker and, as its name suggests, contains pertinent financial information concerning the subject property. To satisfy the criteria of professionally prepared, it is not necessary that a person dedicated to preparing such documents be used; however, the content, scope, and presentation of the memorandum must satisfy expected norms to be considered as being professionally prepared. A memorandum that does not adequately address the important aspects of the target company has overt omissions, or multiple typographical errors, would be considered as unprofessional. An unprofessionally prepared information memorandum can often lower the prospective bidder's interest thereby depressing an ultimate sales price, which leads to an unfair result. Similarly, the process is less meaningful (and indicates lack of good faith and thoroughness) if an executive of the seller merely refers the potential buyers to public SEC filings. In this scenario the buyer is not provided the comfort that a sale is likely to occur.

Embodiments of the present disclosure can include, for example, determining whether the information about the entity prepared for potential buyers included a professionally-prepared information memorandum. See, e.g., item 165 in FIG. 10.

5. Were parties conducting the process able to adapt to market and other changes?

Market changes might include a change in the pricing of raw materials, such as for a steel producer, or a price change in commodities, such as fuel for an airline. Significant market changes typically warrant new projections and possibly rebidding is necessary to establish good faith and foster competition.

Embodiments of the present disclosure can include, for example, calculating a score responsive to whether financial projections were updated or the transaction structure altered during the sales process to thereby determine an ability to adapt to market and other changes. See, e.g., item 166 in FIG. 10.

6. Were the parties who conducted the process generally perceived to be trust-worthy and working to explore the highest and best proposal?

Again, a perception that the process will be conducted in a good faith manner is generally more enticing to purchasers, and encourages the bids made to be more competitive. Thus a competitive process enhances the chances that the process is adequate and will yield a true indication of market value.

Embodiments of the present disclosure can include, for example, calculating a score responsive to whether a special committee of the board of directors, the board of directors, or management administered the sales process to thereby determine a public perception of trust-worthiness. See, e.g., item 167 in FIG. 10. A score for a special committee should be favorable, a score for the board of directors neutral, and a score for management should be unfavorable as understood by those skilled in the art.

7. How much time and attention was devoted to each particular buyer by the parties soliciting, structuring and negotiating the transaction?

Here the focus is on the percentage of time and attention devoted to specific purchasers as well as what individual was assigned to the purchaser. For example, if an experienced staffer was devoted to a single prospective purchaser, whereas junior or less experienced persons were assigned to other purchasers, the process can be skewed in favor of that particular purchaser. Thus in a fair process, not only is the time percentage of attention devoted to each purchaser important, but also the type of attention given each purchaser.

Embodiments of the present disclosure can include, for example, calculating a score responsive to each interaction between a seller and potential buyers. See, e.g., item 168 in FIG. 10.

8. How promptly was the response to supplemental information requests?

Promptness and thoroughness in responding to supplemental information requests supports the thesis of an adequate process. Providing only certain parties with supplemental information or slowing their access to supplemental data can be an indication of an unfair process and dampen competition.

Example

In one non-limiting example of implementation of an embodiment of the method described herein; a list of queries for investigating the criteria explained above are received by a processor, which assigns numerical scores based on data indicative of the inquiries. The example further includes tabulating the numerical scores to generate a final score, and if the final score exceeds a threshold value, determining the sale was exposed to the market so that the process for selling the entity was fair. Conversely, if the final score does not exceed the threshold value, the process for selling the entity is determined to have not been fair.

A. Audience
1. For each instance found in a buyer's log detailing information of communication between the seller/agents and potential buyers that reflects information describing the following communication criteria:
   a) date of a communication between seller/agent and potential buyer,
   b) name of contact person information at potential buyer (including title),
   c) name of contact person on seller/agent team,
   d) status of non-disclosure agreement/data room access/bid received,
   e) other comments.

A score of 4 is given for each field (a)-(e) that are present and completed. A score of 1 is given for each buyer contacted, up to a maximum of 40 points.

2. For each instance identified if a buyer, or buyer's representative, who is listed in the log:
   a) was approached but communication not completed,
   b) was a contact employed or otherwise associated with a potential buyer who was approached or communicated with regarding the potential acquisition, but was not a senior level executive, for example, the person contacted had no authority to agree to purchase the property on behalf of the potential buyer,
   c) for which a confidentiality agreement was not executed.

For each occurrence of the criteria listed in 2a-2c, a value of −1 is assessed to the particular buyer identified; the assessed sum defines a deduction sum for each particular buyer. The deduction sum for each particular buyer is then multiplied by the number of criteria 1a-1e where the particular buyer is identified; this product defines a deduction product for each particular buyer. The deduction product for each particular buyer is limited to a minimum of −20.

3. If more than 3 buyers decline to provide proposals for a reason that could easily be cured by the seller, a score of −10 is assessed. The reason for declining the acquisition should be detailed in the comments field of the buyers log for each buyer that declines to provide an acquisition proposal.

4. For each buyer that was contacted, but:
   a) does not engage in have similar operations to the target, or
   b) has not previously expressed an interest in making acquisitions or investments in the business of the target, or
   c) does not have a strategic correction to the target, (e.g. supplier, distributor, complementary products, or
   d) buyers or their financial sponsors lacking relevant experience in the business of the target.

A score of −1 is assessed.

The total scores for items 1-4 of this section are summed, up to a maximum of 25 points.

B. Information
5. Score 2 points for each potential buyer that executed a confidentiality agreement to receive information regarding the target.
6. Score 0.5 points for each of the following found in the data book:
   a) Up to date projections,
   b) Detail regarding the condition of the company and composition of the financial accounts/statements,
   c) Summary or actual contracts (note subtract one for any major contracts not shared with bidders who are not competitors),
   d) Notification to buyers of updates of any of above information or additions to the data room,
   e) Opportunity to discuss the above information with management or receive a form of road show from the sellers.

The sum of #6 is multiplied by the number obtained from #5, up to a maximum score of 20 points.

C. Timing
7. Identify number of days between initial buyer contact to initial bid date, and assess a score of 2*(number of days/30), for a maximum of 8.
8. Assess a score of 2 points for each public financing, or merger and acquisition, involving a competitor of buyer during the period from initial contact to initial bid, up to a maximum score of 6 points.
9. Assess a score of −25 if the period from the day the first buyer was contacted regarding a sale to the initial bid due date was less than 20 business days.
10. Assess a score of −15 points if material adverse change clauses are invoked by other buyers of similar or larger assets or comparable companies within 5 days before the bid due date.

Sum the scores assessed in steps 7-10, up to a maximum of 10 points.

D. Runway to a Transaction
11. Assess a score of −10 if the debtor cannot articulate clearly how to deliver the assets or business to the highest buyer in cases where total enterprise value is less than the debt. If the debtor proposes a Section 363 bankruptcy sale, then assess a score of 15.
12. Assess a score of 10 points if any impaired creditor groups are involved in negotiations for a Section 363 sale.
13. Assess a score of −15 if the proposed closing date is more than 12 months away from the current date.
14. Assess a score of 10 points if there is a special committee, CRO, or independent director to appraise the sale.
15. Assess a score −10 if the sale will likely provoke significant litigation against a buyer.

Sum the scores assessed in steps 11-15, up to a maximum of 25 points.

E. Negotiation and Execution
16. Assess a score of −15 if the proposed closing date is more than 12 months away from the current date.
17. Assess a score −5 for each buyer that demonstrates their information requests were not responded to in less than 48 hours.
18. Assess a score equal to the number of bidding rounds prior to selecting a winner multiplied by 3, up to a maximum 30 points.
19. Assess a score of 10 points if the seller receives a fairness opinion or "no better deal available" opinion.
20. Assess a score of −20 if more time was spent on an insider bid than the leading outside or independent buyer.
21. Assess a score of 2 for each initial bid received.
22. Assess a score of −1 for calls made to each buyer by a party/agent for the seller that did has not previously sold businesses of similar size (or greater or in a similar business) and does not have at least 5 years of financial advisory experience.
23. Assess a score of −1 for each complaint received by more than 2 buyers that there is inadequate information to make an investment decision or the company is not able to provide information to complete schedules to a purchase agreement at or prior to closing.

The sum of scores from each of the five sections indicates a measurement for exposure to the market, where a final score of 0-50 indicates that company not fully exposed to market and that the sales process was not fair. Also, where a final score greater than 50 indicates that the company was exposed to market such that bids should reflect market value given circumstances of process, and that the process was fair.

A person having ordinary skill in the art will recognize that various types of computing devices and computer architectures, including, for example, laptops, desktops, distributed computing, cloud computing, data centers, mobile and handheld devices, and other systems, are embodiments of the present disclosure, and these embodiments are intended to be included within the scope of the appended claims. That is, the computer-implemented methods and the machine to evaluate a sales process, for example, can be implemented through a distributed computing environment or a personal digital assistant (PDA). A person having ordinary skill in the art will also recognize that various types of memory are media readable by a computer such as described herein. Examples of tangible computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such instructions can be programmed in various computer languages, including, for example, Visual Basic, C++, Java, C, and others.

The present disclosure described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the present method can be accomplished individually, or within a processor, such as a computer, where the commands made to the processor are included therein or supplied by external software applications. These and other similar modifications will readily suggest themselves to those skilled in the art, and are intended to be encompassed within the spirit of the present disclosure disclosed herein and the scope of the appended claims.

What is claimed is:

1. A computer-implemented method of evaluating a process for a sale of a business entity, comprising:
   (a) receiving data in a processor indicative of an audience targeted by a seller of the business entity;
   (b) calculating in the processor an audience score based on the data received in step (a);
   (c) applying in the processor a weighting factor to the audience score to define a weighted audience score;
   (d) receiving data in the processor indicative of information provided by the seller describing the business entity;
   (e) calculating in the processor an information score based on the data received in step (d);
   (f) applying a weighting factor in the processor to the information score that is less than the weighting factor of the audience score thereby defining a weighted information score;
   (g) receiving data in the processor indicative of time that had passed between steps during the process of the sale of the business entity;
   (h) calculating in the processor a time score based on the data received in step (g);
   (i) applying in the processor a weighting factor to the time score that is less than the weighting factor of the audience score thereby defining a weighted time score;
   (j) receiving in the processor data indicative of a transfer of the business entity from the seller of the business entity to a prospective purchaser of the business entity;
   (k) calculating in the processor a transfer score based on the data received in step (j);
   (l) applying in the processor a weighting factor to the transfer score that is the same as the weighting factor of the audience score thereby defining a weighted transfer score;
   (m) receiving in the processor data indicative of a negotiation and execution associated with the sale of the business entity;
   (n) calculating in the processor a negotiation and execution score based on the data received in step (m);
   (o) applying in the processor a weighting factor to the negotiation and execution score that is less than the weighting factor of the audience score thereby defining a weighted negotiation and execution score;
   (p) summing in the processor the weighted scores to define a total score;
   (q) comparing in the processor the total score to a designated threshold score that is accessible by the processor from a database connected to the processor; and
   (r) determining in the processor that the process for the sale of the entity was adequately exposed to a market of prospective purchasers if the total score exceeds the threshold score.

2. The computer-implemented method of claim 1, wherein applying in the processor a weighting factor to the audience score comprises limiting the weighted audience score to a maximum of 25% of a total maximum score.

3. The computer-implemented method of claim 1, wherein applying in the processor a weighting factor to the information score comprises limiting the weighted information score to a maximum of 20% of a total maximum score.

4. The computer-implemented method of claim 1, wherein applying in the processor a weighting factor to the timing score comprises limiting the weighted timing score to a maximum of 10% of a total maximum score.

5. The computer-implemented method of claim 1, wherein applying in the processor a weighting factor to the transaction score comprises limiting the weighted transaction score to a maximum of 25% of a total maximum score.

6. The computer-implemented method of claim 1, wherein applying in the processor a weighting factor to the negotiation and execution score comprises limiting the weighted negotiation and execution score to a maximum of 20% of a total maximum score.

7. The computer-implemented method of claim 1, wherein the step of calculating an audience score comprises:
   a. awarding 4 points if the seller provides a buyer's log that details dates of communication information between the seller and a prospective purchaser;
   b. awarding 4 points if the seller provides a buyer's log that details communication information between the seller and a prospective purchaser and lists a name and title of a contact person at a prospective purchaser;
   c. awarding 4 points if the seller provides a buyer's log that details communication information between the seller and a prospective purchaser and lists a name of a contact person associated with seller;
   d. awarding 4 points if the seller provides a buyer's log that details communication information between the seller and a prospective purchaser and lists status of one of the following, any non-disclosure agreements between seller and a prospective purchaser, access by a prospective purchaser to a data room, a bid for the purchase of the business entity; and
   e. summing the points awarded in steps (a)-(d) to define a first intermediate score.

8. The computer-implemented method of claim 7, wherein the step of calculating an audience score further comprises, (f) awarding a point for each prospective purchaser contacted by seller, and (g) defining a second intermediate score to be the lesser of 40 or the points awarded in step (f).

9. The computer-implemented method of claim 8, wherein the step of calculating an audience score further comprises:
   h. awarding –1 points for every instance in the buyer's log where an inquiry to or from a prospective purchaser was unanswered;
   i. awarding –1 points for every instance in the buyer's log where the prospective purchaser contacted was unauthorized to purchase the business entity;
   j. awarding –1 points for every instance in the buyer's log where a prospective purchaser failed to execute a confidentiality agreement;
   k. sum the points awarded in steps (h)-(j);
   l. multiplying the sum of step (k) by 4 to define a third intermediate adjustment score.

10. The computer-implemented method of claim 9, further comprising awarding –10 points if the buyer's log indicates that more than 3 prospective purchasers declined to submit bids because of an obstacle curable by the seller to define a fourth intermediate adjustment score.

11. The computer-implemented method of claim 10, further comprising:
   m. awarding –1 points for every instance in the buyer's log where a prospective purchaser is engaged in a business different from the business entity being sold;
   n. awarding –1 points for every instance in the buyer's log where the prospective purchaser had not previously expressed an interest in acquiring or investing in the business entity being sold;
   o. awarding –1 points for every instance in the buyer's log where the prospective purchaser is in a stream of commerce different from the business entity being sold;
   p. awarding –1 points for every instance in the buyer's log where the prospective purchaser have no experience in the business entity being sold;
   q. summing the points awarded in steps (m)-(p) to define a fifth intermediate adjustment score.

12. The computer-implemented method of claim 11, further comprising summing the first, second, third, fourth, and fifth intermediate scores to define an audience score, and calculating a weighted audience score to be the lesser of the audience score or 25.

13. The computer-implemented method of claim 1, wherein the step of calculating an information score further comprises:
   a. awarding 0.5 points for every instance where the seller provided a projection of the business entity that substantially accurately reflected the financial status of the business entity;
   b. awarding 0.5 points for every instance where the seller provided details about the condition of the business entity and substantially accurate financial statements;
   c. awarding 0.5 points for every instance where the seller provided details about contracts in which the business entity was a party;
   d. awarding –1 points for every instance where the seller failed to provide details about contracts in which the business entity was a party;
   e. awarding 0.5 points for every instance where the seller provided updates to any information provided in a data room;
   f. awarding 0.5 points for every instance where the seller provided an opportunity to discuss information about the business entity;
   g. summing the points awarded in steps (a)-(f);
   h. awarding 2 points for each prospective purchaser that executed a confidentiality agreement to receive information regarding the business entity;
   i. multiplying the sum of step (g) with the points awarded in step (h) to define an information score; and
   j. calculating a weighted information score to be the lesser of the information score or 20.

14. The computer-implemented method of claim 1, wherein the step of calculating a timing score further comprises:
   a. calculating the number of days between a date of an initial communication between the seller and a prospective purchaser, dividing the number of days by 15 to define a first intermediate score;
   b. awarding 2 points for every instance where a competitor of the business entity was involved in public financing or a merger and acquisition that occurred from a period between an initial contact and an initial bid to define a second intermediate score;
   c. award a score of –25 points if the period from when the first contact from the seller to a prospective to an initial bid due date was less than 20 business days;
   d. award a score of –15 points if a material adverse change clause was invoked by other prospective purchasers of another business entity within 5 days of the initial bid due date;

e. summing the lesser of the first intermediate score and 8, the lesser of the second intermediate score and 6, and the points awarded in steps (c) and (d) to define a timing score; and f. calculating a weighted time score to be the lesser of 10 or the timing score.

15. The computer-implemented method of claim 1, wherein the step of calculating the transfer score comprises:
 a. Awarding a score of −10 points in instances where the seller cannot articulate how to transfer ownership of the business entity to a prospective purchaser and the value of the business entity is greater than debt assigned to the business entity;
 b. Awarding a score of 15 points if the seller proposes a Section 363 bankruptcy sale;
 c. Awarding a score of −15 points if a proposed closing date is more than 12 months in the future;
 d. Awarding a score of 10 points if the sale of the business entity is appraised by an independent entity;
 e. Awarding a score of −10 points if evidence exists that the sale of the business entity to a purchaser will provoke litigation;
 f. Summing the points awarded in steps (a)-(e) to define a transfer score; and
 g. Calculating a weighted transfer score to be the lesser of the transfer score or 25.

16. The computer-implemented method of claim 1, wherein the step of calculating the negotiation and execution score comprises:
 a. awarding a score of 5 points for each instance where a bid received by the seller is greater than an initial proposed selling price of the business entity;
 b. awarding a score of −5 points for each instance where an information request to the seller was not responded to within 48 hours;
 c. awarding a score of 3 points for each round of bids prior to selecting a winning bid;
 d. awarding a score of 10 points if the seller receives a fairness opinion;
 e. awarding a score of −20 points if the seller devoted an amount of time on a bid from a prospective purchaser with a preexisting relationship to the business entity that was greater than an amount of time spent on a bid from a prospective purchaser with no preexisting relationship to the business entity;
 f. awarding a score of 2 points for each instance where an initial bid was received;
 g. awarding a score of −1 points for each instance where the seller contacted a prospective purchaser who had not previously been involved in the sale of a business having a size similar to the business entity;
 h. awarding a score of −1 points for each instance where more than two prospective purchasers indicate inadequate information was provided by seller to enter into an investment decision;
 i. awarding a score of −1 points for each instance where the seller failed to provide information to complete schedules to a purchase agreement prior to closing;
 j. summing the points awarded in steps (a)-(i) to define a negotiation and execution score; and
 k. calculating a weighted negotiation and execution score to be the lesser of the negotiation score and 20.

17. The computer-implemented method of claim 1, wherein the threshold value is 50% of a maximum total score.

18. The computer-implemented method of claim 1, further comprising determining in the processor that the process for the sale of the entity was not adequately exposed to a market of prospective purchasers if the total score is equal to or less than the threshold score.

* * * * *